(12) United States Patent
Juenger et al.

(10) Patent No.: US 10,946,279 B1
(45) Date of Patent: Mar. 16, 2021

(54) CONTEXT-BASED NOTIFICATIONS ON A USER DISPLAY

(71) Applicant: Sony Interactive Entertainment Inc., Tokyo (JP)

(72) Inventors: Elizabeth Ruth Juenger, San Francisco, CA (US); Ryan David Sutton, San Francisco, CA (US); Makoto Oshita, Tokyo (JP); Zentaro Kaji, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/557,559

(22) Filed: Aug. 30, 2019

(51) Int. Cl.
*A63F 13/00* (2014.01)
*A63F 13/537* (2014.01)
*G06F 3/0481* (2013.01)
*G06F 3/0484* (2013.01)

(52) U.S. Cl.
CPC .......... *A63F 13/537* (2014.09); *G06F 3/0481* (2013.01); *G06F 3/04842* (2013.01)

(58) Field of Classification Search
None
See application file for complete search history.

(56) References Cited

U.S. PATENT DOCUMENTS

| | | | |
|---|---|---|---|
| 6,907,447 B1 | 6/2005 | Cooperman et al. | |
| 9,032,321 B1 | 5/2015 | Cohen et al. | |
| 9,462,570 B1 | 10/2016 | Bostick et al. | |
| 9,485,312 B2 * | 11/2016 | Gniffke | G06Q 10/06 |
| 10,200,237 B1 | 2/2019 | Gupta et al. | |
| 10,431,004 B2 | 10/2019 | Yoon et al. | |
| 10,728,088 B1 | 7/2020 | Pawaskar | |
| 2003/0182383 A1 | 9/2003 | He | |
| 2004/0061716 A1 | 4/2004 | Cheung et al. | |
| 2006/0010217 A1 | 1/2006 | Sood | |
| 2007/0174768 A1 | 7/2007 | Sen et al. | |
| 2007/0214429 A1 | 9/2007 | Lyudovyk et al. | |
| 2007/0218884 A1 | 9/2007 | Kuwahara et al. | |
| 2009/0222748 A1 | 9/2009 | Lejeune et al. | |

(Continued)

FOREIGN PATENT DOCUMENTS

KR 20160101545 8/2016

OTHER PUBLICATIONS

PCT/US2020/047060, "International Search Report and Written Opinion", dated Nov. 13, 2020, 11 pages.

(Continued)

*Primary Examiner* — Paul A D'Agostino
(74) *Attorney, Agent, or Firm* — Kilpatrick Townsend & Stockton LLP

(57) ABSTRACT

Techniques for managing notifications are described. In an example, a computing device presents content in an application window based on an execution of an application. Notification data is received by a computing device. Based on a context associated with the computing device, such as whether the application window is the foreground and whether the notification data is associated with the application or such as the operational mode of the computing device, a determination is made whether to present a corresponding notification in-context within the application window or in a pop-up window. Otherwise, the notification is added to a notification list and can be summarized in a notification summary.

20 Claims, 22 Drawing Sheets

(56) References Cited

U.S. PATENT DOCUMENTS

| | | | |
|---|---|---|---|
| 2010/0014717 A1* | 1/2010 | Rosenkrantz | H04N 7/18 382/115 |
| 2011/0004845 A1 | 1/2011 | Ciabarra | |
| 2011/0167383 A1 | 7/2011 | Schuller et al. | |
| 2011/0239228 A1 | 9/2011 | Grigsby et al. | |
| 2012/0101981 A1* | 4/2012 | Arms | G06F 16/248 707/608 |
| 2012/0198002 A1 | 8/2012 | Goulart et al. | |
| 2013/0159417 A1 | 6/2013 | Meckler et al. | |
| 2014/0256288 A1* | 9/2014 | Allen | H04W 12/02 455/411 |
| 2014/0273975 A1 | 9/2014 | Barat et al. | |
| 2014/0280657 A1 | 9/2014 | Miller et al. | |
| 2014/0306817 A1* | 10/2014 | Ricci | B60R 25/20 340/457 |
| 2014/0330933 A1 | 11/2014 | Papakipos et al. | |
| 2014/0351744 A1 | 11/2014 | Jeon et al. | |
| 2015/0004945 A1 | 1/2015 | Steeves et al. | |
| 2015/0181555 A1 | 6/2015 | Dey et al. | |
| 2015/0181556 A1* | 6/2015 | Dey | H04L 67/26 455/466 |
| 2015/0317104 A1 | 11/2015 | Takenouchi | |
| 2015/0319309 A1* | 11/2015 | Cunico | G06F 40/40 379/202.01 |
| 2015/0372961 A1* | 12/2015 | Phung | H04L 51/28 709/206 |
| 2016/0065528 A1* | 3/2016 | Weksler | H04L 51/24 709/206 |
| 2016/0072907 A1 | 3/2016 | Papakipos et al. | |
| 2016/0078483 A1* | 3/2016 | Arneson | G06F 9/542 705/14.56 |
| 2016/0180152 A1* | 6/2016 | Rosenkrantz | G06K 9/6202 382/118 |
| 2016/0330160 A1 | 11/2016 | Shan et al. | |
| 2017/0041769 A1* | 2/2017 | Shim | H04W 4/12 |
| 2017/0099592 A1 | 4/2017 | Loeb et al. | |
| 2017/0206120 A1* | 7/2017 | Yi | G06F 9/542 |
| 2017/0244798 A1 | 8/2017 | DeLuca et al. | |
| 2017/0257757 A1 | 9/2017 | Huang et al. | |
| 2017/0337045 A1* | 11/2017 | Hills | G06F 8/38 |
| 2018/0081514 A1* | 3/2018 | Bostick | H04L 67/24 |
| 2018/0145871 A1 | 5/2018 | Golin | |
| 2018/0165708 A1* | 6/2018 | Bajaj | G06Q 30/0277 |
| 2018/0188935 A1 | 7/2018 | Singh et al. | |
| 2018/0219824 A1 | 8/2018 | Laller | |
| 2018/0321992 A1* | 11/2018 | Chen | G06F 9/542 |
| 2018/0324122 A1 | 11/2018 | Schwartz | |
| 2019/0056978 A1 | 2/2019 | Ruiz-meraz et al. | |
| 2019/0334848 A1 | 10/2019 | Chen et al. | |
| 2019/0342411 A1 | 11/2019 | Becker et al. | |
| 2020/0192868 A1 | 6/2020 | McBeath | |
| 2020/0233539 A1 | 7/2020 | Liu et al. | |

OTHER PUBLICATIONS

PCT/US2020/047064, "International Search Report and Written Opinion", dated Nov. 25, 2020, 11 pages.

PCT/US2020/047070, "International Search Report and Written Opinion", dated Nov. 25, 2020, 11 pages.

"Smart Method of Managing Notification on Mobile Device", Database Technical Disclosure, IP.com, Mar. 21, 2016, pp. 1-8.

* cited by examiner

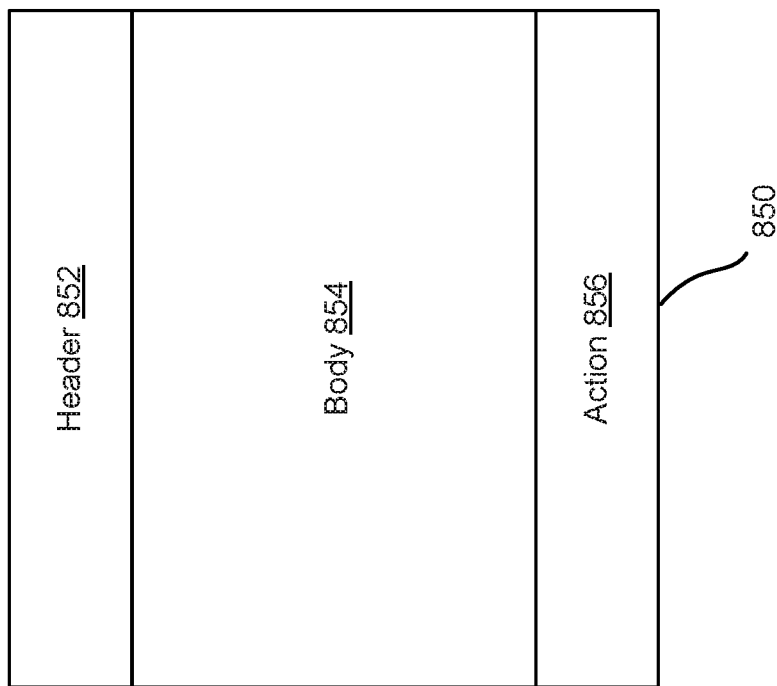
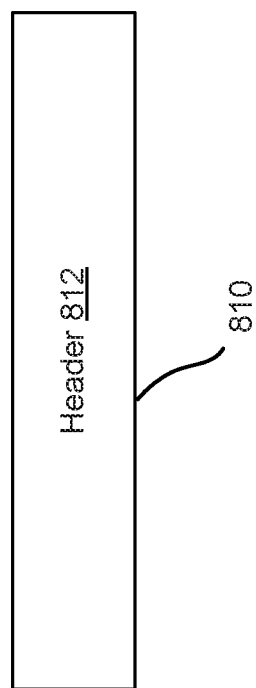
FIG. 8

US 10,946,279 B1

CONTEXT-BASED NOTIFICATIONS ON A USER DISPLAY

CROSS-REFERENCES TO RELATED APPLICATIONS

This application is related to application Ser. No. 16/557,578, filed on the same day herewith, and application Ser. No. 16/557,600, filed on the same day herewith, and the entire contents of which are hereby incorporated by reference as if fully set forth herein, at least under 35 U.S.C. § 120.

BACKGROUND

Graphical user interfaces (GUIs) are the predominant type of interfaces available to users for interacting with computer systems. A GUI is operable to present notifications to a user. For example, upon receiving message data, a messaging application presents a text message on the GUI. Similarly, upon receiving a news alert, a news application presents a news notification on the GUI.

Typically, when a first application is presenting content on the GUI (e.g., a video game application presenting video game content) and notification data is destined to a second application (e.g., the messaging application), the full notification data may not be presented on the GUI (e.g., the entire text message) unless the presentation of the content is paused and a switch is performed from the first application to the second application. Accordingly, user input may be needed to switch to the second application prior to the notification data being presented. Additional user input may be needed to dismiss the notification data and resume the presentation of the content.

Hence, although a GUI can be an effective user interface, switching between applications may not be seamless and the presentation of information may be limited. There is a need for an improved GUI that allows better presentation of notifications.

BRIEF SUMMARY

Techniques for presenting notifications are described. In an example, a computer system presents, in an application window on a display, content based on an execution of an application. The computer system also receives notification data and determines a match between a first context associated with the notification data and a second context associated with the application. The computer system presents a notification in the application window based on the match. The notification corresponds to the notification data and is presented while a presentation of the content continues.

BRIEF DESCRIPTION OF THE DRAWINGS

FIG. 8 illustrates examples of a state of a notification, according to embodiments of the present disclosure.

DETAILED DESCRIPTION

Figure 1:
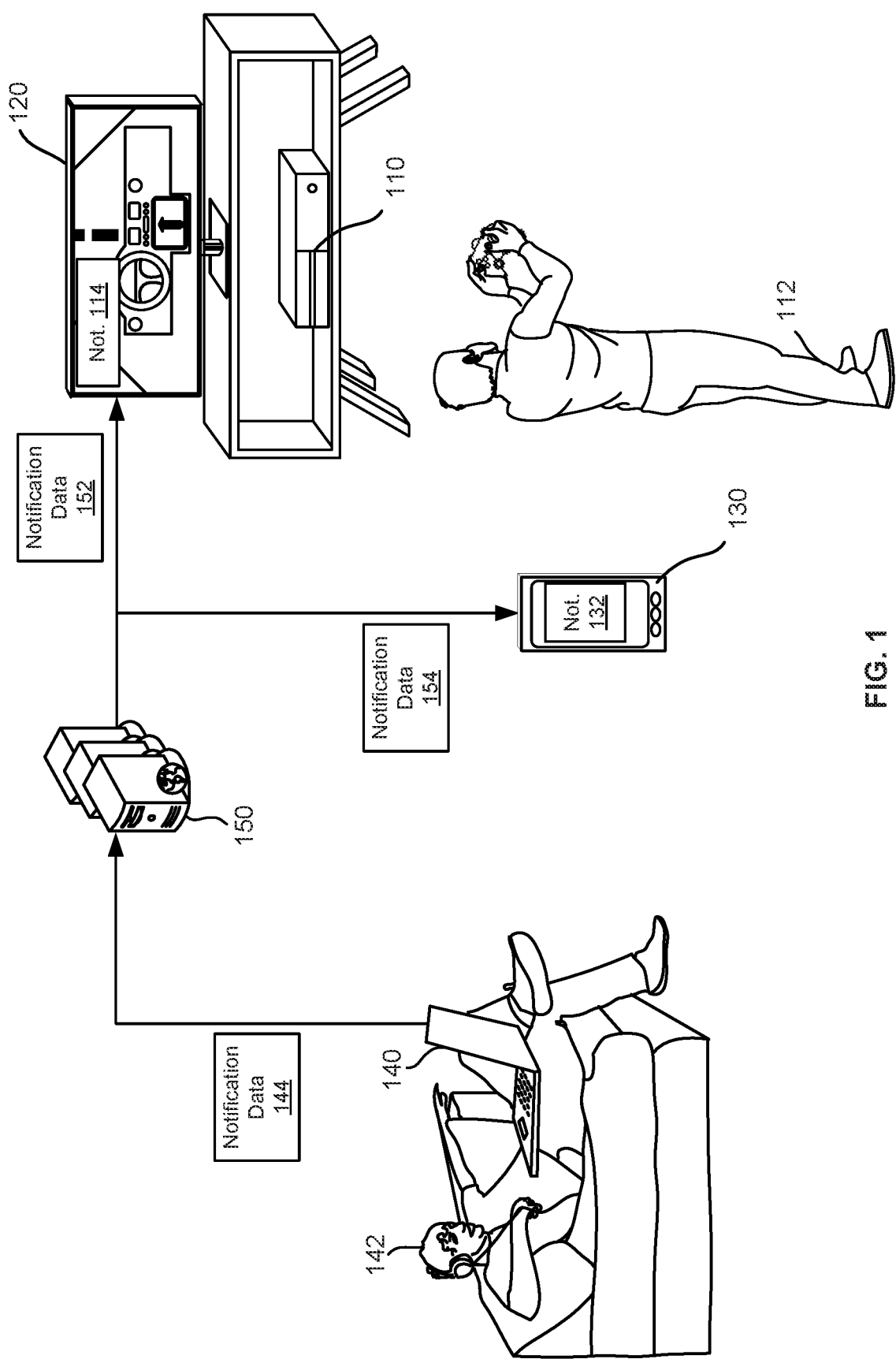
FIG. 1 illustrates an example of a computing environment for presenting notifications, according to an embodiment of the present disclosure.

Generally, systems and methods for better management of notifications are described. In an example, a computer system presents a GUI on a display. Upon an execution of an application, content of the application is presented in the GUI. The computer system also determines a context associated with a user of the application and/or with execution of one or more applications. The context indicates user interactions and interest with the application(s). In addition, the computer system stores notification rules specifying when, how, where, and/or what notifications should be presented based on the context. Upon receiving notification data, the computer system manages the presentation of a corresponding notification based on the context and the notification rules. Managing the notifications includes multiple aspects. In a first aspect, the computer system determines whether the notification should be presented in the GUI and the type of presentation (e.g., in-context or pop-up) or whether such a presentation should be restricted. In a second aspect, when a restriction determination is made, the computer system can add the notification to a notification summary and can update the notification summary over time based on priorities of the notifications. Upon a change to the context, the notification summary is presented on the display. In a third aspect, notifications not presented to the user can be added to a notification list. The notification list is updated over time, whereby some or all of the notifications are replaced, modified, and/or grouped. Additionally, upon the presentation of a notification, the presentation of the underlying content continues, whereby no user input may be needed to switch back and resume the presentation of this content. The presented notification can be also updated given a change to the context such that any information and/or selectable action presented in the notification continues to be relevant to the most current context.

To illustrate, consider an example of a video game system that hosts a video game application, a chat application, a video streaming application, a social media application, and multiple other applications. Upon a login of a video game player, the video game system presents a home user interface on a display. From this interface, the video game player can launch the video game application and video game content can be presented within an application window in a foreground on the display. Upon receiving notification data from a device of a second user, the video game system determines that the notification data is associated with the chat application. Given that the application window in the foreground corresponds to the video game application rather than the chat application, the video game system presents the corresponding notification in a pop-up window laid over the application window. The notification is presented in a collapsed state indicating that a message was sent from the second user, while the presentation of the video game content continues and the application window remains in the foreground. Upon a user interaction with the notification, the video game system presents the notification in an expanded state, where the actual content of the notification and a selectable option to respond are presented. In this state, the presentation of the video game content also continues and the application window remains in the foreground.

Next, the video game player completes a level of the video game and the video game system receives user input to initiate a flow for downloading and launching the next level. A new application window is presented on the display. In an example, a different application than the video game application, such as a menu application, is executed and can present the new application window. The new application window presents a confirmation of the user input (e.g., the next level is being downloaded). As the tasks within the flow are being performed, the video game system receives system notifications about these tasks and presents an in-flow notification within the new application window. The in-flow notification provides updates about the tasks.

Subsequently, the video game player launches the chat application. Chats with other users are presented within an application window of the chat application in the foreground. During an active chat with the second user, the video game system receives second notification data from the second device and presents a corresponding text in the application window. Given that the text is available within a viewing area of the application window, the video game system can alert the video game player about the text by presenting a visual indicator around the text (e.g., a blue rectangle, a flashing rectangle, or any other visual alert). This visual indicator corresponds to an in-line notification indicating that new notification data is available within the viewable area.

Following a scroll-up to view previous texts, third notification data is received from the second device. Here, the corresponding text should be presented, but its presentation would not be in the current viewing area. Accordingly, the video game system presents an in-application notification within the viewing area indicating that new text is available and would be presented upon a scroll down.

The video game player switches from the chat application to the video streaming application. The video game system executes the video game application and presents an application window for this application in the foreground. The application window presents video content streamed from a network source. A video operational mode indicates that, while video is being streamed, social media notifications should be restricted. Accordingly, during the streaming, the video game system receives first notification data corresponding to an invitation of the second user to a first social media event starting in five minutes. The corresponding first social media notification is suppressed rather than being presented while the video stream is occurring, and is sent to a notification list. Ten minutes later, and while the video stream continues, the video game system received second notification data corresponding to an invitation of the second user to a second social media event starting in one hour. Because the first event expired and the two social media notification are from the same second user, the video game system replaces the first social media notification with the second social media notification in the notification list. Upon an end of the video stream, the notification list can be presented on the display, such that the second social media notification can be viewed and the invitation to the second media event can be accepted.

In another illustration, while the video game player is playing the video game and video game content is presented in the foreground, the video game system receives social media notification data. Given the game title and the user interactions with the video game, the video game system determines that the corresponding social media notification should be queued rather than presented given that the context indicates an immersive game session. Accordingly, the video game system adds the social media notification to a queue and, optionally, sends the social media notification to a mobile device associated with the video game player. Notifications in the queue are organized according to priorities, where each priority can be updated based on the relevance of the corresponding notification to the current context and on the recency of the notification. Upon a change to the context, such as an end of a video game level, the video game system can present a notification summary identifying the total number of notifications that have been queued. Upon a user interaction with the notification summary, the video game system presents the notification summary in an expanded state. In the expanded state, the video game system presents the top three (or some other number) highest priority notifications and provides an option to view the remaining notifications. Each of the three notifications is presented in a collapsed state and can be further selected to be presented in an expanded state. The content (e.g., information and selectable action(s)) in each of the summarized notifications is updated based on the current context.

Embodiments of the present disclosure provide several advantages over existing computer systems and their underlying GUIs. For example, effectivity of a GUI and efficiency of underlying processing and memory are improved. In particular, the GUI can provide an improved user experience, whereas timely and relevant notifications are presented to a user on the GUI, while the ongoing content presentation continues, and other notifications are summarized and/or added to a notification list for later presentation. In this way, a user may view the relevant notifications in a timely manner and, as needed, expanded any of such notifications without interrupting the ongoing content presentation. Because relevant notifications are presented, the processing and memory usage can be reduced relative to existing systems that would present all notifications and would necessitate a switch back and forth between foreground and background applications.

In the interest of clarity of explanation, the embodiments may be described in connection with a video game system. However, the embodiments are not limited as such and similarly apply to any other type of a computer system. Generally, a computer system can include one or more user devices, each communicatively coupled with one or more displays. The computer system can also include a backend system, such as a server, that tracks contexts across the one or more devices, and the receipt, queuing, prioritizing, and/or interactions with notifications, among other functionalities.

FIG. 1 illustrates an example of a computing environment for presenting notifications, according to an embodiment of the present disclosure. As illustrated, the computing environment includes a video game system 110 communicatively coupled with a display 120, a mobile device 130 that integrates a display, a backend server 150, and a user device 140. The video game system 110 and the mobile device 130 are available to a video game player 112 (e.g., operated by the video game player 112 or associated with the video game player 112 under a user account). In comparison, the user device 140 is available to a user 142 (e.g., another video game player). The backend server 150 provides management functionality to control when, how, where, and/or what notifications should be presented.

In an example, the user 142 operates the user device 140 to send notification data 144 targeted to the video game player 112. The backend server 150 receives the notification data 144 and determines that the video game player 112 is associated with the video game console 110 and the mobile device 130. The backend server 150 also determines a context associated with the video game player 112 and/or the video game console 110. Based on the context, the backend server 150 determines whether corresponding notification data 152 should be sent to the video game console 110 for presentation on the display 120 as a notification 114 or whether such a presentation should be restricted. If the notification 114 is to be presented, the backend server 150 determines the type of the notification 114, such as whether it should be an in-context notification or a pop up notification. The video game player 112 can operate a user input device, such as a video game controller, to interact with the video game system 110. The user input device can include a button operable to interact with the notification 114. Interacting with the notification 114 can include viewing the notification in one or more states, dismissing the notification 114, requesting a notification summary that includes the notification 114, requesting a notification list that includes the notification 114, or any other types of interactions.

In addition, the backend server 150 determines whether corresponding notification data 154 should be sent to the mobile device 130 for a presentation as a notification 132 on the display of the mobile device 130. In an illustration, if the notification 114 should not be presented by the video game console 110, the backend server 150 sends the notification data 154 to the mobile device 130. In this illustration, the notification data 152 can be sent to a queue for a notification summary and its priority in the queue can be updated based on whether a user interaction with the notification 132 presented by the mobile device occurred.

In an example, a notification represents an output presentable on a user interface, such as a GUI, and notifying a user by including presentable information and/or a selectable action. A text message, a social media post and/or like, a multimedia (e.g., audio, video, video game content) download status, a multimedia purchase are examples of a notification. Notification data represents data usable to populate the notification, upon presentation and metadata that defines presentation parameters of the notification. In existing systems, a notification is typically presented in a dedicated notification area, such as the bottom right or a top bar of GUI on a display. Notification data is. In comparison, embodiments of the present disclosure allow the presentation of a notification in other areas of the GUI. In particular, a notification can be a pop-up notification that can be presented in a pop-up window laid over an application window in the foreground. A notification can be an in-context notification that can be presented within the application window. Different types of in-context notifications are possible, such as in-line notifications, in-application notifications, and in-flow notifications. Each of the types corresponds to a presentation style. An in-line notification corresponds to a style of in-line presentation and represents a notification having presentable information located in a user viewing area within the application window. An in-application notification corresponds to a style of in-application presentation and represents a having presentable information located outside of the user viewing area but within the application window. An in-flow notification corresponds to a style of in-flow presentation and represents a notification having presentable information about tasks of a flow being performed.

Pop-up, in-line, in-application, and in-flow notifications can be dynamically updated based on the most current context. In addition, each of the Pop-up, in-line, in-application, and in-flow notifications can be associated with multiple attributes including a source application (e.g., the application that generated the notification), a destination application (e.g., the application that should present the notification), a notification type (e.g., a message), notification subject (e.g., a message thread), an accumulation parameter (e.g., a counter, such as the number of messages), a time sensitivity (e.g., should be presented immediately; otherwise, the notification is outdated), a priority, a timestamp (e.g., the time a notification was received), and/or an expiration time (e.g., the notification is no longer relevant past the expiration time). Such attributes are usable to manage the presentation of a notification.

Generally, the backend server 150 backend server 150 can also determine the current context. The backend server 150 also stores rules specifying when, how, where, and/or what notifications should be presented based on the context. The rules can be defined according to notification settings that can have default values and configured via user input of the video game player 112 at the video game console 110. Some or all of the notification settings can be configured and updated dynamically based on an artificial intelligence model, such as one using a machine learning algorithm, trained based on historical data of multiple video game players.

Although the backend server 150 is shown as a separate computer system from the video game console 110, some or all of the functionalities of the backend server 150 can be implemented by the video game system 110 (e.g., the video game system 110 can include a video game console specific to the video game player 112 and a cloud server available to multiple players). For example, the rules can be stores locally on the video game system 110, whereas the notification settings can be stored locally in association with a user profile or remotely on the backend server 150 also in association with a user profile. The context determination can be performed locally on the video game console 110. In addition, the video game player 112 can be associated with a different number and other types of devices. For instance, in addition to or instead of being associated with a mobile device 130, the video game player 112 can be associated with a tablet, a desktop computer, or any other user device.

Figure 2:
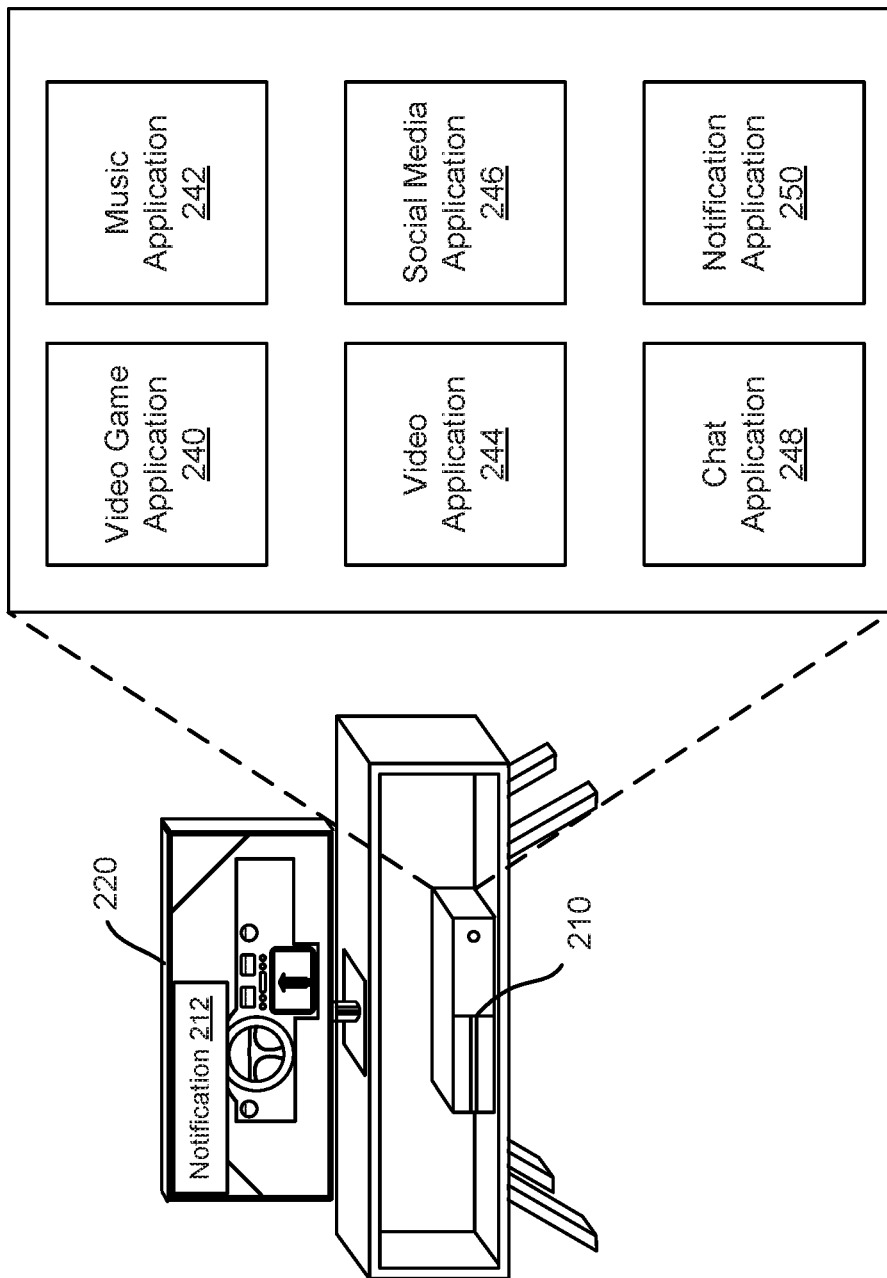
FIG. 2 illustrates a computer system that presents notifications, according to an embodiment of the present disclosure.

FIG. 2 illustrates a computer system that presents notifications, according to an embodiment of the present disclosure. As illustrated, the computer system includes a video game console 210 and a display 220. Although not shown, the computer system may also include a backend system, such as a set of cloud servers, that is communicatively coupled with the video game console 210. The video game console 210 is communicatively coupled with a video game controller (not shown) and with the display 220 (e.g., over a communications bus). A video game player operates the video game controller to interact with the video game console 210. These interactions may include playing a video game presented on the display 220 and interacting with other applications of the video game console 210.

The video game console 210 includes a processor and a memory (e.g., a non-transitory computer-readable storage medium) storing computer-readable instructions that can be executed by the processor and that, upon execution by the processor, cause the video game console 210 to perform operations relates to various applications. In particular, the computer-readable instructions can correspond to the various applications of the video game console 210 including a video game application 240, a music application 242, a video application 244, a social media application 246, a chat application 248, and a notification application 250, among other applications of the video game console 210 (e.g., a home user interface (UI) application that facilitates a home page on the display 220).

The video game controller is an example of an input device. Other types of the input device are possible including, a keyboard, a touchscreen, a touchpad, a mouse, an optical system, or other user devices suitable for receiving input of a user.

In an example, upon an execution of the video game application 240, a rendering process of the video game console 210 presents video game content (e.g., illustrated as a car race video game content) in an application window on a GUI of the display 220. The application window is presented in the foreground of the GUI, indicating that the video game application is active and user input at the video game controller is usable to interact with the video game application. In comparison, other applications can also be executing either in the background or their application windows can be presented in the background of the GUI indicating that the user input is not usable to interact with such applications.

Upon receiving notification data from another device, the notification application 250 determines attributes for a corresponding notification 212 including, for instance, whether the notification data is targeted to the video game application 240, the music application 242, the video application 244, the social media application 246, or the chat application 246. The notification application 250 can also determine a context, such as the level of user interactions and the active application (e.g., the video game application 240 having a foreground application window), and can apply rules to determine whether the corresponding notification 212 should be presented in a pop-up window over the foreground application window or as an in-context notification within the foreground application window, or whether the corresponding notification 212 should be restricted (e.g., queued in a notification summary or added to a notification list). If the notification 212 should be presented, the notification application 250 passes through, for instance, an application programming interface (API), the notification data and instructions for presenting the notification 212 (e.g., as a pop-up or in-context) to the active application (e.g., the video game application 240). In turn, the active application presents the notification 212 as pop-up over the foreground application window or in-context within the foreground application window.

Although FIG. 2 illustrates that the different applications are executed on the video game console 210, the embodiments of the present disclosure are not limited as such. Instead, the applications can be executed on the backend system (e.g., the cloud servers) and/or their execution can be distributed between the video game console 210 and the backend system.

Figure 3:
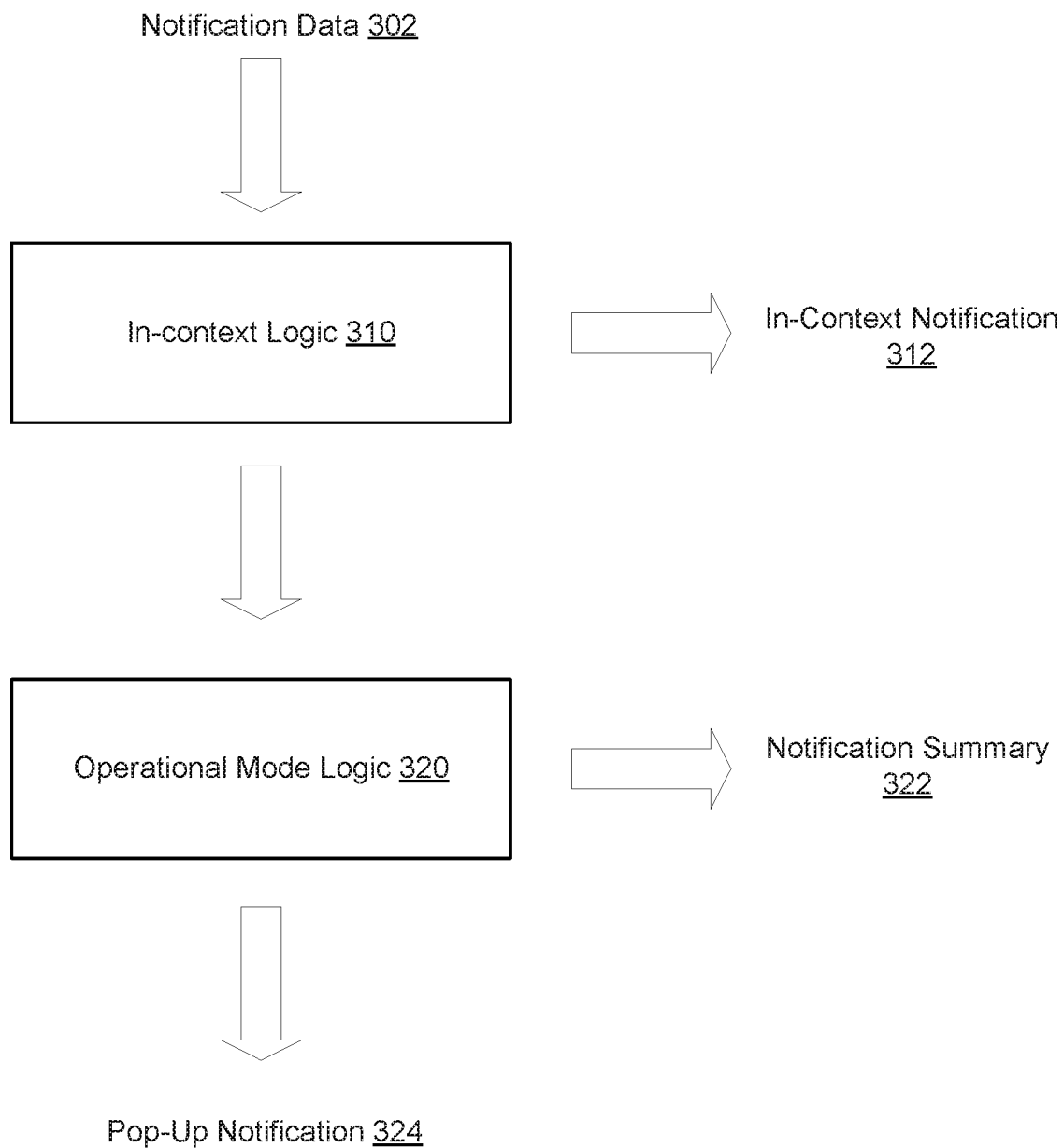
FIG. 3 illustrates an example of modules for presenting notifications, according to an embodiment of the present disclosure.

FIG. 3 illustrates an example of modules for presenting notifications, according to an embodiment of the present disclosure. As illustrated, upon receiving notification data 302, the modules are used to determine whether an in-context notification 312 having an in-context presentation style (e.g., a style of any of an in-line presentation, in-application presentation, or in-flow presentation), a notification summary 322, or a pop-up notification 324 should be used. In particular, a first module implements an in-context logic 310 to determine whether the in-context notification 312 should be presented. If not, a second module implements an operational mode logic 320 to determine whether the notification summary 322 should be presented. If not, a determination is made to present the pop-up notification 324.

In an example, each of the in-context logic 310 and the operational mode logic 320 is implemented as computer-readable instructions, such as software code, that can be executed by a processor. Such instructions can be stored in a non-transitory computer-readable medium, such as a computer memory and can be part of a notification application, such as the notification application 250 of FIG. 2. The computer-readable instructions, as stored in the non-transitory computer-readable medium, and the processor represent a module. The module can be a computing component of a video game system, such as the video game system 110 of FIG. 1, a backend server, such as the backend server 150 of FIG. 1, or distributed between the video game system and the backend server.

In an example, the in-context logic 310 includes or has access to a set of rules specifying whether the in-context notification 312 should be presented based on a context associated with the notification data 302, one or more users, and/or one or more applications. The set of rules can be predefined as conditional statements and can be customized based on user preferences. The user preferences can be indicated in user settings and/or the customization can be performed based on a machine learning algorithm.

Similarly, the operational mode logic 320 includes or has access to a set of rules specifying whether the notification summary 322 should be presented based on an operational mode of a device. The set of rules can be predefined as conditional statements and can be customized based on user preferences. The user preferences can be indicated in user settings and/or the customization can be performed based on a machine learning algorithm.

Although FIG. 3 illustrates two modules, a different number and/or a different arrangement of modules are possible. For instance, a third module may be implemented to determine whether a notification should be added to a notification list. Operations of these modules are further illustrated in connection with the next figures.

Turning to FIGS. 4-7, the figures illustrate examples of in-line, in-application, in-flow, and pop-up notifications. The type of the notification to present depends on a context associated with notification data, a user, and/or an application available to the user. Understanding where the users' attention is and what repercussions there would be if the user missed the notification are factors that are considered. If a user is not distracted and/or if the notification is relevant to the current context, an in-context notification (in-line, in-application, or in-flow notification). If the notification would cause user frustration, confusion, or negative and/or is less relevant, a pop-up notification is possible. A set of rules implementing this approach can be defined.

In an example, a notification generally relates to an activity, an update, an event, or feedback about a task from a flow being performed. If the activity, update, or event occurred in a viewing area within an application window that is in the foreground, an in-line notification can be used. If the activity, update, or event occurred outside of the viewing area but within the application window, an in-application notification can be used. If the application window presents information about the flow, an in-flow notification can be presented to provide the feedback. On the other hand, if the activity, update, or event occurred in the background or in an application window presented in the background, a pop-up notification can be used. Similarly, if feedback is about a completion of a sensitive task, a task failure, or a task that was initiated remotely and is still processing when a user login in to a device, a pop-up notification can also be used.

Figure 4:
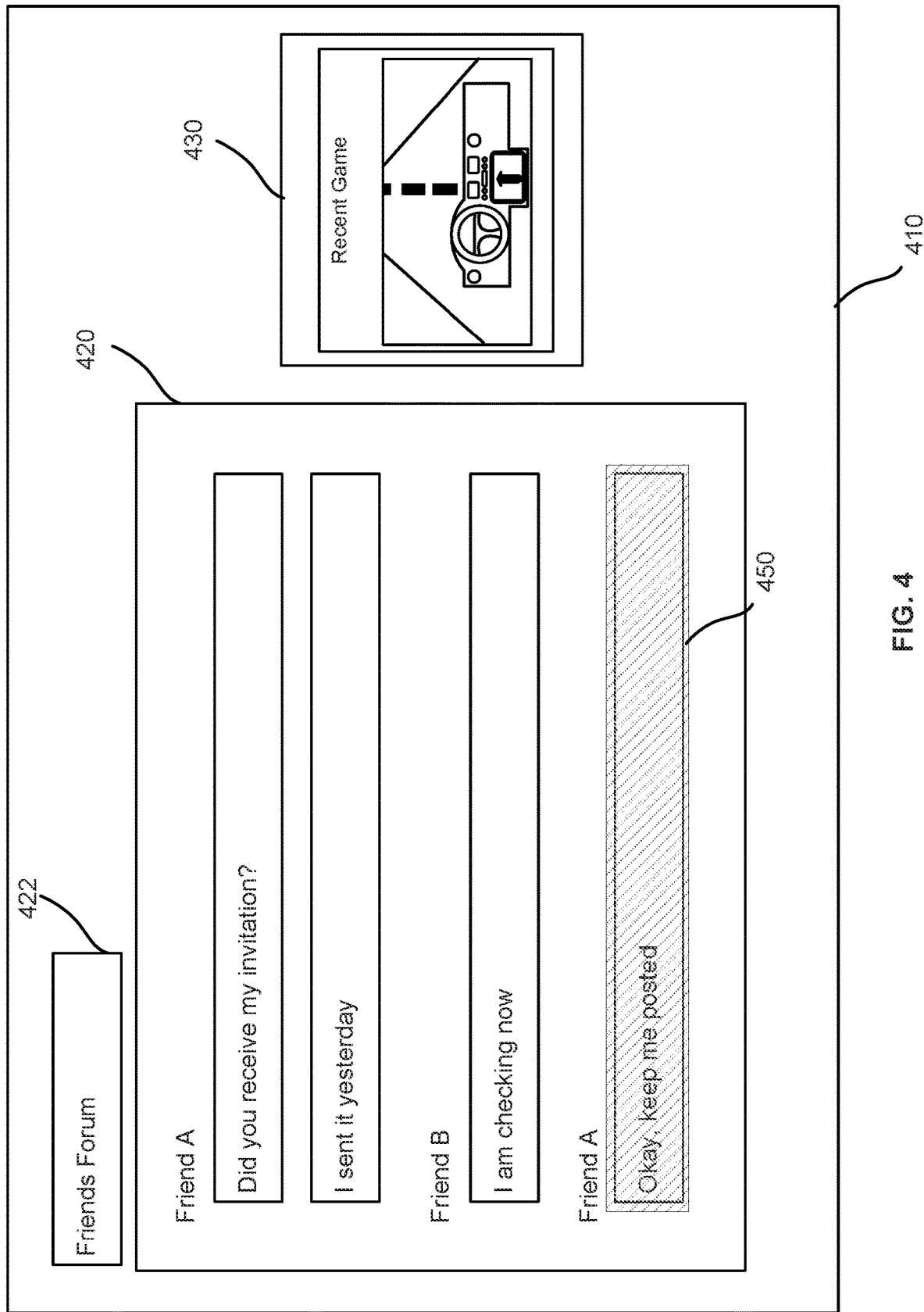
FIG. 4 illustrates an example of an in-line notification, according to embodiments of the present disclosure.

FIG. 4 illustrates an example of an in-line notification, according to embodiments of the present disclosure. Generally, an in-line notification is used when the location of the presentable information (e.g., notified content) of the notification is in the area where a user is currently viewing (e.g., a user viewing area). The presentable information is updated and/or animated to be in view of the user.

As illustrated, a GUI 410 is presented on the display. An application is being executed (e.g., a chat application) and presents content (e.g., chat content) in an application window 420 on the GUI 410. The presented content relates to a subject 422 (e.g., a chat thread). In addition, a second window 430 is presented on the GUI 410 and provides information about other applications (e.g., a video game that was recently executed).

Notification data is received (e.g., text for a chat from Friend A). A determination is made that the notification data is associated with the application (e.g., the chat application is the destination of the chat), rather than the second window 430, and with the subject 422 (e.g., the text belongs to the chat thread). Accordingly, a determination is made to present an in-context notification.

Next, a determination is made that the notification data (e.g. the text from Friend A) can be presented in a location within a user viewing area of the application window 420 (e.g., the notification data would be in view to a user when presented). Because the location is within the viewing area, an in-line notification 450 is possible. The in-line notification 450 provides a visual indicator of the notification data, such as an indicator that updates and/or animates the notification data (e.g., a blue rectangle around the text of the chat, or any other type of visual indicator).

Figure 5:
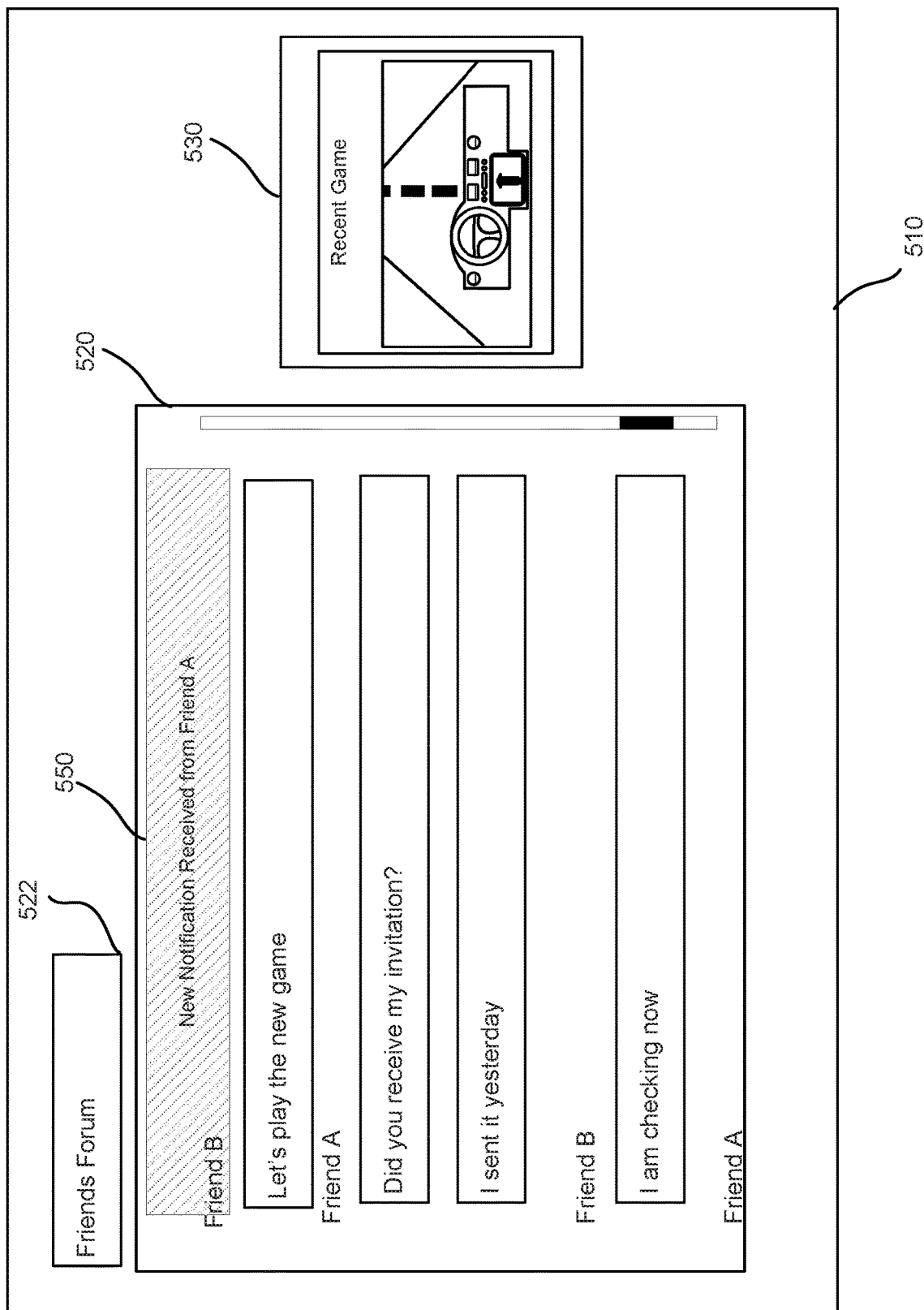
FIG. 5 illustrates an example of an in-application notification, according to embodiments of the present disclosure.

FIG. 5 illustrates an example of an in-application notification, according to embodiments of the present disclosure. Generally, an in-application notification is used when the location of the presentable information (e.g., notified content) of the notification is within an application window that is in the foreground (e.g., an area of focus), but is outside of the viewing area. The in-application notification is presented within the viewing area and can alert the user that the presentable information is outside of the viewing area. The in-application notification can be interactive such that, upon a user interaction with the in-application notification, the viewing area is changed to show the location of the presentable information.

As illustrated, a GUI 510 is presented on the display. An application is being executed (e.g., a chat application) and presents content (e.g., chat content) in an application window 520 on the GUI 510. The presented content relates to a subject 522 (e.g., a chat thread). In addition, a second window 530 is presented on the GUI 510 and provides information about other applications (e.g., a video game that was recently executed).

Notification data is received (e.g., text for a chat from Friend A). A determination is made that the notification data is associated with the application (e.g., the chat application is the destination of the chat), rather than the second window 530, and with the subject 522 (e.g., the text belongs to the chat thread). Accordingly, a determination is made to present an in-context notification.

Next, a determination is made that the notification data (e.g. the text from Friend A) can be presented in a location outside of the user viewing area of the application window 520 (e.g., the notification data would be shown at the end of the chat thread, but the user has scrolled up and the current viewing area excludes the end of the chat thread). Because the location is outside of the viewing area, an in-application notification 550 is possible. The in-application notification 550 provides a visual indicator that the presentable information is available to the user at a location outside of the viewing area, but within the application window 520 (e.g., the notification includes a description that new text was received and is available upon a scroll down to the end of the chat thread).

Figure 6:
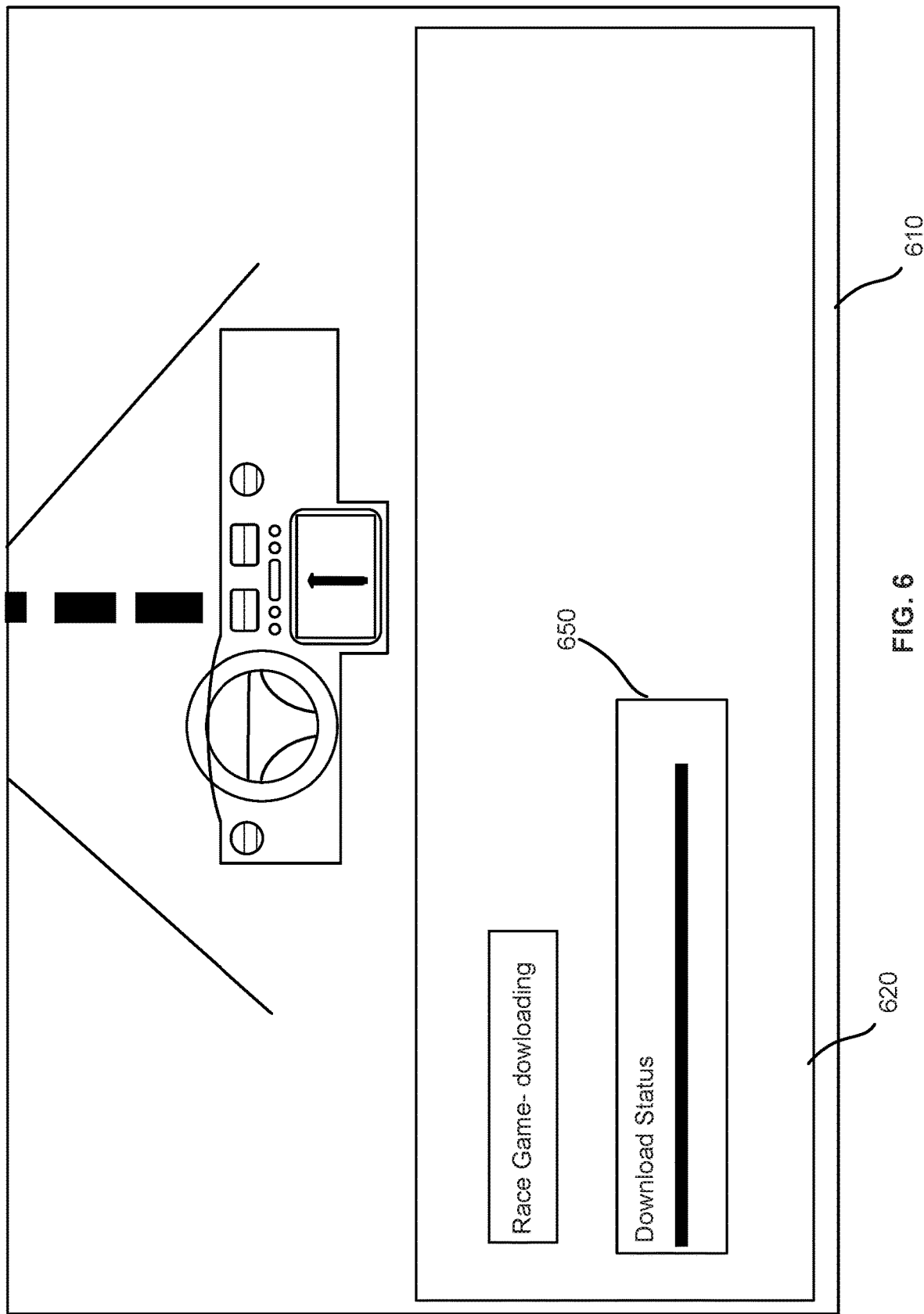
FIG. 6 illustrates an example of an in-flow notification, according to embodiments of the present disclosure.

FIG. 6 illustrates an example of an in-flow notification, according to embodiments of the present disclosure. Generally, an in-flow notification is used when the flow of an activity in the foreground communicates and provides feedback to a user about one or more tasks of the flow being performed.

As illustrated, a GUI 610 is presented on the display. An application is being executed (e.g., a video game application) and presents content about a flow (e.g., download, install, or purchase a video game application, video game level, another application, or any other content) in an application window 620 on the GUI 610.

Notification data is received (e.g., progress of the download is received from a network source). A determination is made that the notification data is associated with the application (e.g., the video game application), and with the flow (e.g., the download). Accordingly, a determination is made to present an in-flow notification 650. The in-flow notification 650 provides a visual indicator about the progress of the flow and/or the tasks that are being performed. The in-flow notification 650 is presented within the application window 620 and is updated to reflect the progress. Once the flow is complete (e.g., the download is complete), the in-flow notification 650 is updated to present a selectable action related to the flow (e.g., a launch button to launch the downloaded application).

Figure 7:
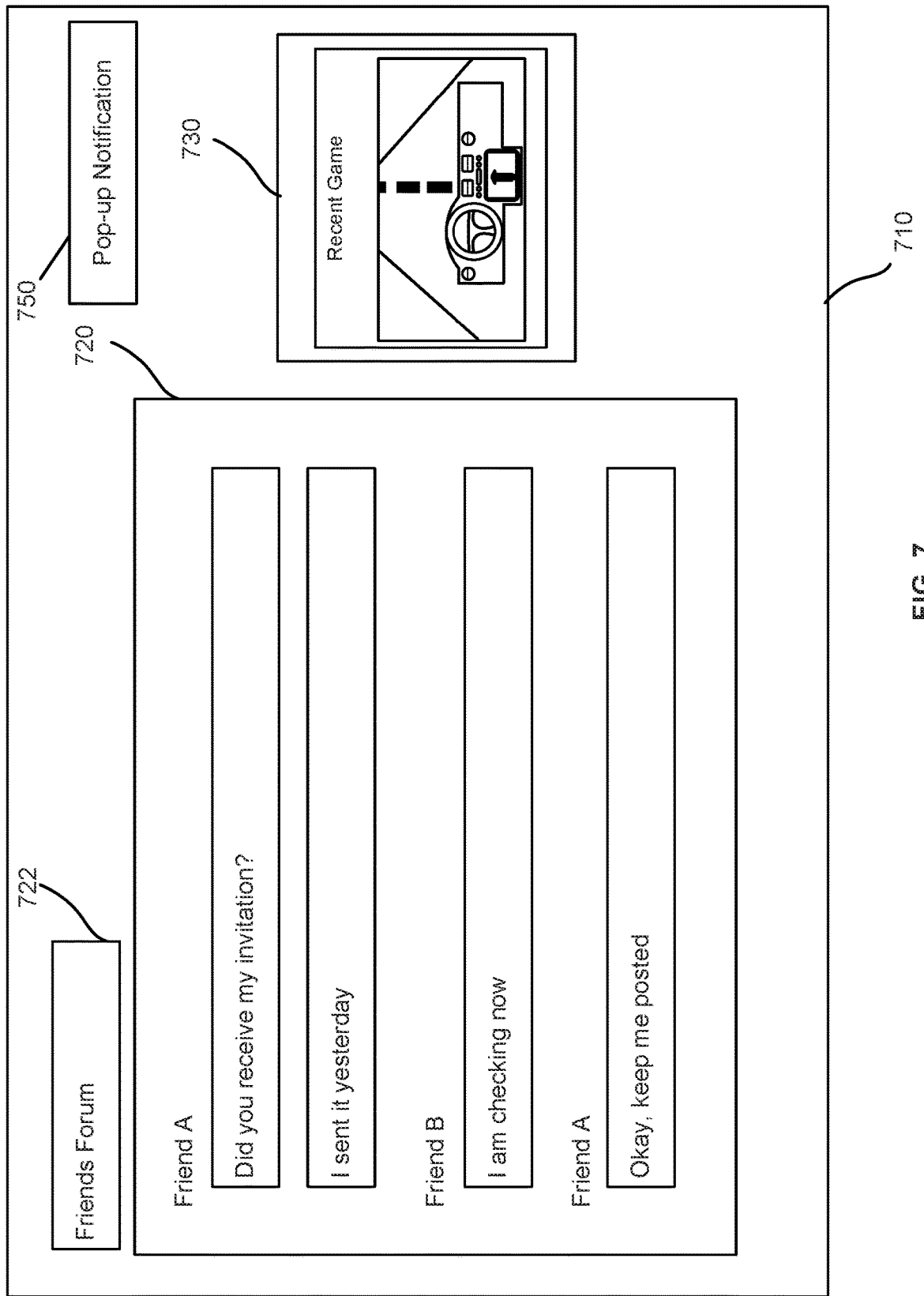
FIG. 7 illustrates an example of a pop-up notification, according to embodiments of the present disclosure.

FIG. 7 illustrates an example of a pop-up notification, according to embodiments of the present disclosure. Generally, a pop-up notification is used when the notification data is unassociated with an application presenting content in an application window that is in the foreground (e.g., an active application) and when the notification data is time sensitive and/or relevant to a context of the user and/or the application. The pop-up notification is presented in a pop-up window laid over the application window. The presentation of the content continues in the application window and the user focus remains on the application (e.g., user input at a controller is used to interact with the presented content).

As illustrated, a GUI 710 is presented on the display. An application is being executed (e.g., a chat application) and presents content (e.g., chat content) in an application window 720 on the GUI 710. The presented content related to a subject 722 (e.g., a chat thread). In addition, a second window 730 is presented on the GUI 410 and provides information about other applications (e.g., a video game that was recently executed).

In one example, notification data is received (e.g., a system notification, data associated with the recently executed video game application, etc.). A determination is made that the notification data is unassociated with the application (e.g., the chat application is not the destination of the notification data). Accordingly, a determination is made not to present an in-context notification. In another example, the notification data is associated with the application. However, in this example, a determination is made that the notification data is unassociated with the subject 722 (e.g., the notification data relates to a different chat thread). Hence, a determination is also made not to present an in-context notification in this example.

Next, a determination is made that whether a pop-up notification 750 should be presented. If the notification data is associated with a different thread or with the second window 730, is a system notification, or is feedback about a completion of a sensitive task, a task failure, or a task that was initiated remotely and is still processing when a user login in to the device presenting the GUI 710, the determination can be to present the pop-up notification 750. The pop-up notification 750 can be laid over the application window 720 or located over any other area of the GUI 720. For instance, the notification 750 can slide from right to left on the top side of the GUI 720 or can slide from top to bottom on the top side of the GUI 720. If another pop-up notification is already presented on the GUI 720, the new pop-up notification 750 can be shown below the existing pop-up notification or can slide and push down the existing pop-up notification.

Generally, when an in-context or a pop-up notification is presented, the execution of an active application continues and the presentation of content by the active application in an application window in the foreground also continues. Different types of information can be used for the notification depending on the type of the notification. For instance, an in-line notification can visually indicate that notification data is available at a location within a user viewing area. An in-application notification can visually indicate that notification data is available at a location outside of the user viewing area and may not include the notification data. In comparison, an in-flow notification or a pop-up notification can include some or all of the notification data. In addition, different states of the notification can be used depending on the type of the notification. For instance, the in-line notification can be presented according to one state, whereas the other types of notification can be presented according to one of multiple possible states. If multiple states are used, the type and/or amount of presentable information changes between the states.

FIG. 8 illustrates examples of a state of a notification, according to embodiments of the present disclosure. A first state corresponds to a collapsed state, in which minimum information is presented to alert a user about the receipt of notification data. A second state corresponds to an expanded state, in which some or all of the notification data can be presented.

In an example, a notification is presented in a collapsed state 810. In this state 810, the notification includes a header 812 that generally identifies the type and/or title of the notification (e.g., "text message from a friend" for a chat notification).

In an expanded state 850, the size of the notification is increased and its content is updated to provide supplemental information. For instance, the notification includes a header 852 (which could be the same as the header 812; in other words, the size and presentable information in the header do not change between the states). The notification also includes a body 854 and an action 856. The body 854 provides supplementary information derived from the notification data (e.g., the actual text from the text message). The action 856 represents a selectable icon that can trigger the related application to perform a task or trigger a flow (e.g., a respond icon for responding to the text message). If action 856 is selected, an application window for the related application can be presented and used or the notification can be shown in a third state that provides the functionalities of such an application window.

Once the notification is presented, whether in the collapsed state 810 or the expanded state 850, its content (e.g. information in the header, body, and/or action) can be updated over time. For instance, when an inflow notification is presented, the body of such a notification can show a progress of the flow and is updated depending on the status of the progress.

Figure 9:
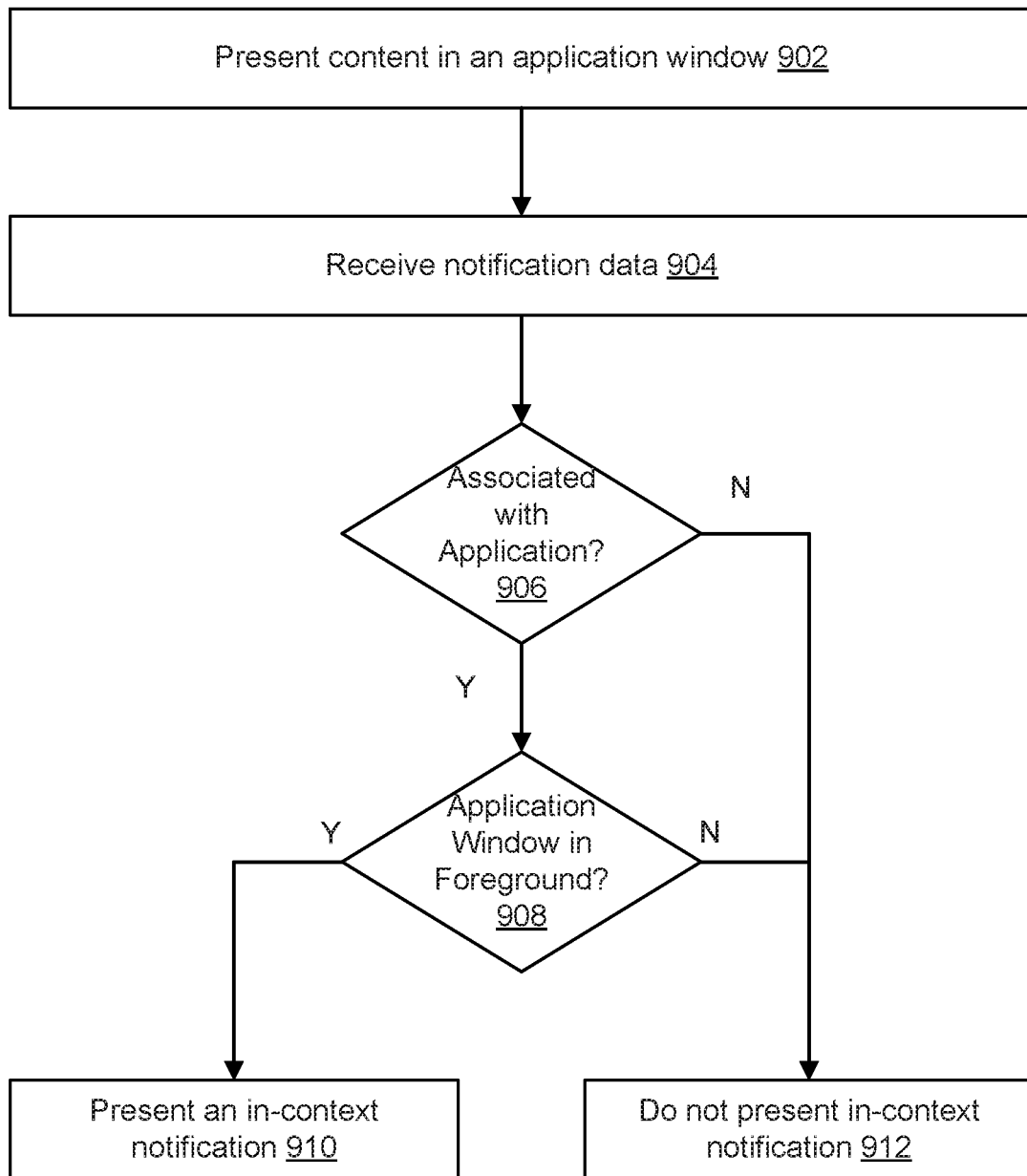
FIG. 9 illustrates an example of a flow for presenting an in-context notification, according to embodiments of the present disclosure.

FIG. 9 illustrates an example of a flow for presenting an in-context notification, according to embodiments of the present disclosure. The operations of the flow can be implemented as hardware circuitry and/or stored as computer-readable instructions on a non-transitory computer-readable medium of a computer system, such as a video game system or backend server. As implemented, the instructions represent modules that include circuitry or code executable by a processor(s) of the computer system. The execution of such instructions configures the computer system to perform the specific operations described herein. Each circuitry or code in combination with the processor represents a means for performing a respective operation(s). While the operations are illustrated in a particular order, it should be understood that no particular order is required.

As illustrated, the flow starts at operation 902, where the computer system presents content in an application window. For example, an application is executing and presents the content in the application window on a GUI of a display.

In an example, at operation 904, the computer system receives notification data. The notification data is received from another device and is associated with a context. The context indicates a source application, a destination application, a notification type, and/or a notification subject, among other attributes. Other information can also be indicated by the context.

In an example, at operation 906, the computer system determines whether the notification data is associated with the application. In particular, if the destination application of the notification data is the same as the application, a determination is made that the notification data is associated with the application. In this case, operation 908 follows operation 906. Otherwise, operation 912 follows operation 906.

In an example, at operation 908, the computer system determines whether the application window is in the foreground. If so, the notification data is associated with an active application and, accordingly, a determination is made to present an in-context notification. In this case, operation 910 follows operation 908. Otherwise, operation 912 follows operation 908.

In an example, at operation 910, the computer system presents the in-context notification within the application window. Different types of in-context notifications are possible. In an illustration, if the notification data is presentable in a location within a user viewing area of the application window, an in-line notification is used. If the notification data is presentable in a location outside of the user viewing area, an in-application notification is used. If the notification data relates to a flow that has been triggered and the application window presents information about the flow, an in-flow notification is used.

In an example, at operation 912, the computer system has determined that the notification data is unassociated with the active application and/or the application window is not in the foreground. Accordingly, the computer system determines that the presentation of an in-context notification should be restricted. Instead, the computer system can determine whether a pop-up notification should be presented, whether the notification data should be sent to a queue for addition to a notification summary, and/or whether the notification should be sent to a notification list. Different techniques are possible to perform this determination. In one example technique, a set of rules is used to determine whether the pop-up notification should be used. Otherwise, the notification data can be added to the notification summary and/or notification list. The set of rules generally specify that if the notification is time sensitive and/or has a certain level of relevance to a user, the pop-up notification should be used. For instance, if an activity, update, or event related to the notification data occurred in the background or in an application window presented in the background, the pop-up notification can be used. Similarly, if feedback is about a completion of a sensitive task, a task failure, or a task that was initiated remotely and is still processing when a user logs in to a device, the pop-up notification can also be used. Otherwise, the notification data can be added to the notification summary and/or the notification list. In another example technique, an operational mode can be used. Here, the operational mode can be associated with notification settings indicating whether the pop-up notification is permitted or restricted. If permitted, the pop-up notification is presented. Otherwise, the notification data can be added to the notification summary and/or the notification list. The use of an operational mode is further described in connection with the next figures.

In the above description of the flow, the association of notification data with an application and the application presenting content in a foreground application window are examples of matching contexts. Other ways to use contexts and/or other types of contexts are also possible.

In an example, the computer system can determine whether a match between a context associated with the notification data and a context associated with the application exists. If a match exists, the computer system can determine a presentation style for an in-context notification as illustrated under operation 910 (e.g., an in-line presentation style, an in-application presentation style, and/or an in-flow presentation style). Otherwise, the computer system can determine that a pop-up notification should be presented, or some other form of restricting the presentation of an in-context application is to be used. Here in this example, the context associated with the notification data includes at least one of a first user identifier associated with a first user of the application, a second user identifier associated with a second user of a source application that generated the notification data, a subject of the notification data, a type of the notification data, a first application identifier associated with the application, a second application identifier associated with the second application, a first platform identifier associated with a first platform hosting the application (e.g., a video gaming platform), or a second platform identifier associated with a second platform hosting the source application (e.g., a social media platform). The context associated with the application includes at least one: the first user identifier, the first application identifier, the first platform identifier, an operational mode, or an indication that the application window is in a foreground of the display. The match exists when, for instance, the first user identifiers are the same in the two contexts (or can be mapped to a same user account), the first application identifiers are the same in the two context, and/or the first platform identifiers are the same in the two contexts. A match also exists when the operational mode and/or the foreground state indicate that the subject of the notification data, the type of the notification data, the second user identifier, the second application identifier, and/or the second platform identifier are associated with a permission to present the notification data (e.g., are on an exception list).

Some or all of these contexts can be similarly used in other ways under operations 906 and/or 908. For instance, the notification source, the notification type and/or the notification subject can be further used for determining whether the in-context notification should be presented. If the notification source is on an exception list of permitted application, the in-context notification can be presented. Additionally or alternatively, if the notification type matches a permitted type and/or the notification subject matches a subject of content presented in the foreground application window, the in-context notification can be presented. To illustrate, the active application is a chat application running on a first device of a first user. A second user operates a second device to execute another instance of the chat application and sends text as notification data. Assuming that the notification source (e.g., the other instance of the chat application) and the notification type (e.g., a chat) are permitted, the in-context notification can be presented if the text corresponds to an ongoing chat thread. Otherwise, a pop-up notification is used.

Other types of contexts are also possible. A user context and an application context are examples of such possible contexts. A user context indicates a level a level of attention (or focus) of the user to the content. Different techniques are available to determine this level. In one example technique, the operational mode of the device indicates the level of user attention. For instance, a user watching a movie can correspond to a lower level of attention than a user playing a video game. In another example technique, the type of content indicates the level of user attention. For instance, a user playing a chess video game can correspond to a lower level of attention than a user playing a first-person shooter video game. In yet another technique, gaze information detected by an eye tracking system or motion data detected by a motion tracking system can indicate the level of user attention. For instance, gaze information indicating that the user is not looking at the GUI or motion information indicating a relatively low level of motion can correspond to a lower level of attention than when the gaze is on the GUI or a higher level of motion is detected. The application context indicates a level of user interaction with the application. Different techniques are also available to determine this level. In one example technique, the operational mode of the device indicates the level of user interaction. For instance, in the movie mode, a relatively lower level of user interaction is expected in comparison to a gaming mode. In another example technique, the type of content indicates the level of user attention. For instance, for a chess video game, a relatively lower level of user interaction is expected in comparison to a first-person shooter video game. In yet another technique, the amount and/or frequency of user input received at an input device (e.g., a video game controller) indicates the level of user interaction. The larger the amount is and/or the higher the frequency is, the higher the level of user interaction is.

Given the user context and/or application context, rules can be defined to trigger in-context notification of a specific type or a pop-up notification or to use a notification summary or notification list. For instance, if the user attention level and/or user interaction level is high (e.g., exceeding a predefined threshold level), an in-context notification is shown only if the notification data relates to the activity that the user is engaged in (e.g., is associated with the active application). Otherwise, a pop-up notification is used if the notification data is time sensitive or is relevant to the user context and/or application context. And otherwise, the notification data is sent to a notification summary and/or a notification list.

Furthermore, the above flow is illustrated in connection with conditional statements that can be stored as a set of rules. The conditional statements can be predefined and manually updated based on user input to reflect user preferences and/or user settings. In addition, such rules and/or other types of rules can be automatically learned by the computer system. For example, data about the user context and/or the application context can be tracked for the user and across different users. A machine learning (ML) algorithm is trained based on such data to output parameters that define the rules. Such rules can then be pushed to the computer system or the trained ML algorithm itself can be hosted on the computer system, whereby the user context and/or application context are used as an input and output is received indicating whether a notification should be presented and the notification type.

Figure 10:
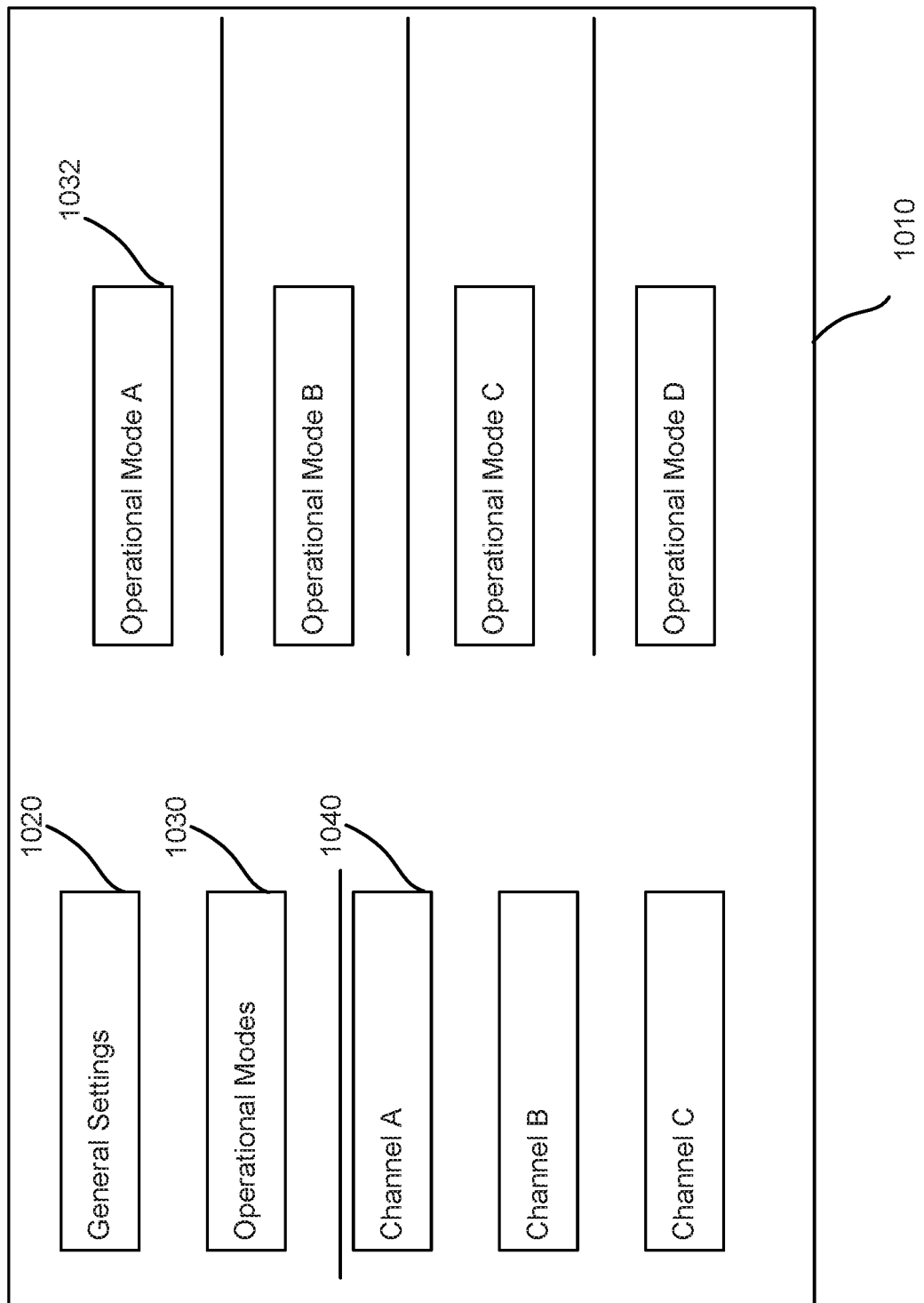
FIG. 10 illustrates an example of operational modes of a device, according to embodiments of the present disclosure.

FIG. 10 illustrates an example of operational modes of a device, according to embodiments of the present disclosure. The device presents a GUI 1010 on a display. The GUI 1010 includes different fields related to notification settings. A first field 1020 corresponds to general settings, a second field 1030 corresponds to operation modes, and a third field corresponds to notification types (illustrated as different channels, such as a social media channel providing social media notification, a gaming channel providing gaming notifications, a media and events channel providing media and event notifications, a downloads and uploads channel providing download and upload notifications, promotions and offers channel providing promotion and offer notifications, etc.). Each of the three fields can be selected to further present notification settings that can be defined under the selected field. FIG. 10 illustrates a selection of the operational mode field 1030.

As illustrated, multiple operational modes are possible (FIG. 10 shows four of such modes). Such modes can be identified in different fields 1032, and each of such fields can be selected to further present the notification settings applicable to the corresponding operational mode, as further illustrated in FIG. 11. Each mode indicates a mode of operation of the device. Within each of such modes, a different user context and/or a different application context can be expected. In other words, the level of user attention and/or the level of user interaction can change between the operational modes. The notification settings can be varied between the operational modes to reflect this change.

To illustrate, the device is a video game console. The operational models include a gaming mode, a content on demand mode (e.g., a movie and video mode), a content broadcast mode, or a virtual reality mode. In the gaming mode, a higher level of user attention and/or user interaction can be expected relative to the content on demand mode or the content broadcast mode, but lower than that of the virtual reality mode.

Figure 11:
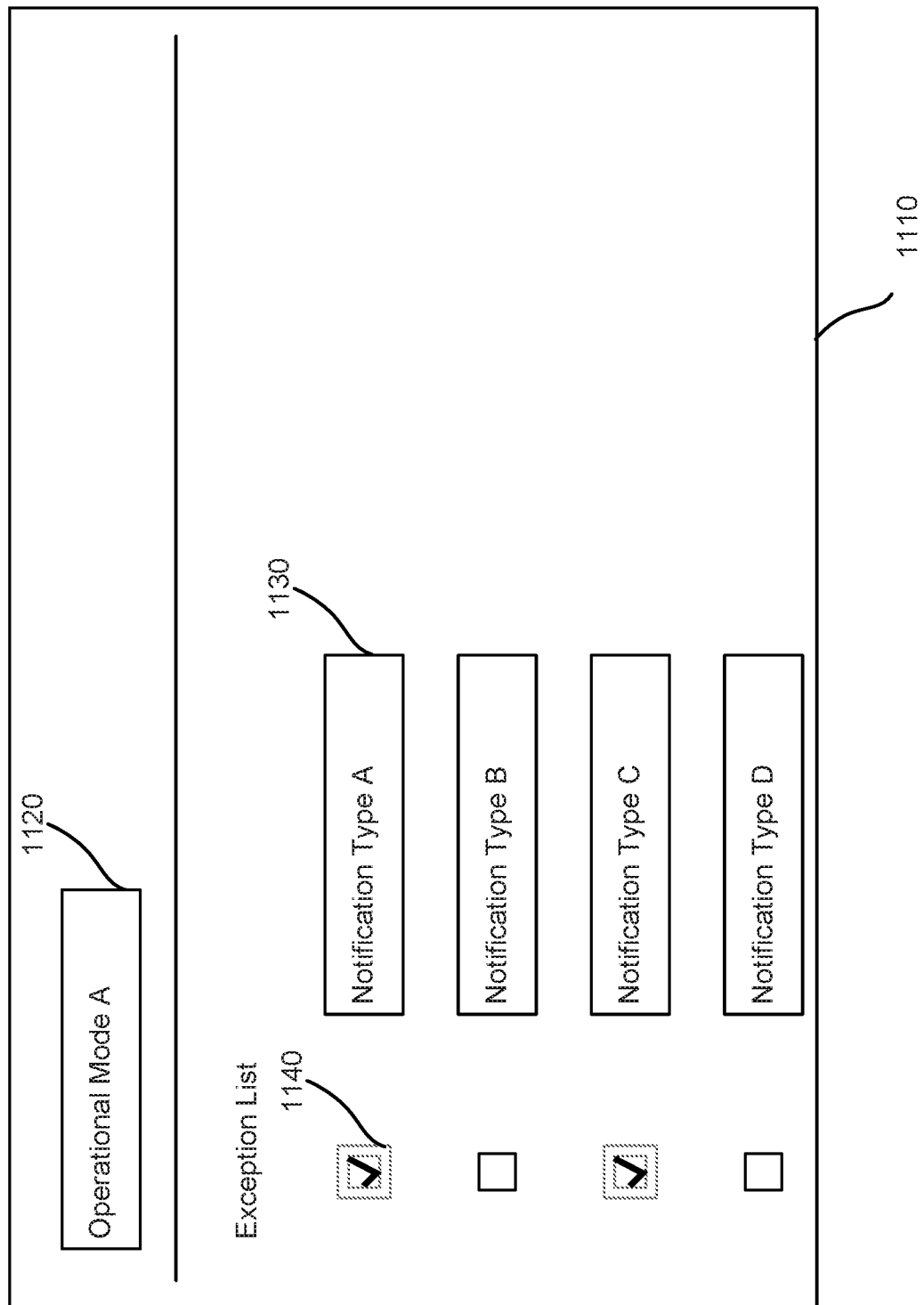
FIG. 11 illustrates an example of notification settings associated with an operational mode, according to embodiments of the present disclosure.

FIG. 11 illustrates an example of notification settings associated with an operational mode, according to embodiments of the present disclosure. For example, upon a user selection of the "operational mode A" as presented in the fields 1032 of FIG. 10, the notification settings applicable to the selected operational mode are presented.

In an example, a GUI 1110 identifies the operational mode 1120 and presents an exception list showing different notification types 1130 (e.g., download complete, upload complete, friends online, invitation to a game, invitation to a broadcast, music track change, group activity, etc.). Each of such notification types 1130 can be selected. For instance a checkbox 1140 can be displayed next to each notification type and, when checked, indicates that the notification type was selected. A selection of a notification type from the exception list indicates that, when notification data is received and is associated with the selected notification type, a corresponding notification can be presented (whether in-context or pop-up) when the device is in the operational mode 1120. In other words, the operational mode 1120 is associated with an exception list and, only when a notification type on the exception list is selected can the corresponding notification be presented. If a notification type is unselected, the presentation of the corresponding notification is restricted.

Although FIG. 11 illustrates an exception list, other types of list can be used. For instance, a permission list is possible. When a notification type under the permission list is unselected, the presentation of the corresponding notification is permitted. If selected, the presentation of the notification is restricted. In addition, although notification types are illustrated, other parameters can be used to define the permissions and restrictions per operational model. For instance, the exception list can identify source applications, destination applications, and/or types of the source applications and/or destination applications (e.g., social media applications, gaming applications, etc.). If any of these parameters is selected, notification data associated with the selected parameter (e.g., notification data associated with a selected source application, a destination application, or an application type) can result in a presentation of a corresponding notification.

Each of the operational modes can be associated with its own set of notification settings. Such settings can be set to a certain default configuration (e.g., default selections and of notification types). User input can also be received to change the default configuration (e.g., to unselect selected notification settings and select unselected notification settings). In addition, changes to the default or customized configurations can be pushed from a computer system (e.g., one including a backend server). In an example, to support the push, the computer system automatically learns the changes. For instance, data about a user context and/or application context can be tracked for a user and across different users under each of the operational modes. A ML algorithm is trained based on such data to output parameters that define the configuration.

In an example, the device is in an operational mode associated with notification settings. Notification data is received. The notification type (and, additionally or alternatively, the source application, destination application, type of the source application, type of the destination application) associated with the notification data is checked against the notification settings. If the notification settings permit the presentation of the corresponding notification, the notification data is further used to present an in-context notification or a pop-up notification. Otherwise, the corresponding notification can be sent to a queue for addition to a notification summary or can be added to a notification list such that the notification can be retrieved and presented at a different point in time.

A notification summary supports the organizing of notifications that have not be shown according to priorities and the presenting of a subset of the highest priority notifications to a user along with an option to view the remaining notifications. FIGS. 17-20 describe examples of the notification summary. In comparison, a notification list represents a different way of organizing notifications as further illustrated in FIGS. 12-16. Generally, the notification list includes notifications having different attributes (e.g., of different notification types, associated with different source applications and/or destination applications, etc.). In addition, in the notification list, a notification can be replaced, replaced and accumulated, modified, and/or grouped with other notifications such that, when the notification list is presented to the user, up-to-date notifications are presented. In addition, a notification is added to a notifications list given a certain context (e.g., given that the device is in a particular operational mode that restricts the presentation), can be subsequently presented as an in-context notifications or as a pop-up notification when the context changes (e.g., the device changes to a different operational mode that permits the presentation). Hence, replacement, replacement and accumulation, modification, and grouping operations can also impact the presentation of in-context and pop-up notifications.

Figure 12:
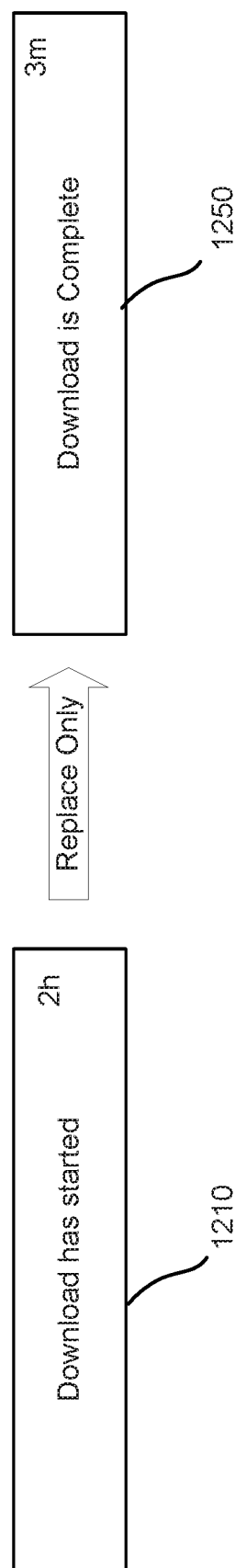
FIG. 12 illustrates an example of replacing a notification, according to embodiments of the present disclosure.

FIG. 12 illustrates an example of replacing a notification, according to embodiments of the present disclosure. Notification replacement represents a method in which a first notification is removed and a second notification replaces the first notification. Generally, the second notification has a more recent time stamp than the first notification. The notification replacement can result in a new notification (e.g., in-context or pop-up) and can place such a notification at the top of a notification list.

In an example, the notification replacement does not include any information or indication of the previous notification that was replaced. Accordingly, this replacement method is typically used if it is no longer valuable to inform the user of the prior content which has been replaced. A set of rules can be defined to reflect this approach. For instance, the notification replacement is used when the previous content is outdated (e.g., its time stamp is in the past) or is no longer relevant (e.g., the notification data is associated with an application that is no longer active). The notification replacement is also used when the content being replaced is about a status of a task within a flow (e.g., the download was ongoing and is now complete). The notification replacement is also used when the notification data includes information that was updated, but the update does not impact the relevance of the notification data (e.g., when the notification data indicates a name of a video game team changed for a third time, where the quantity of "two" does not impact the relevance).

As illustrated in FIG. 12, a first notification 1210 relates to a task (e.g., a download). The first notification 1210 has a first time stamp (e.g., two hours) and indicates a task status (e.g., a start of the download). As the task progresses, additional notification data is received indicating a progress of the task. Because the notification data is about the task status, the notification data is used to replace the first notification 1210. In particular, a second notification 1250 replaces the first notification 1210 and has a second time stamp (e.g., three minutes) indicating the status at that time stamp (e.g., the download was complete three minutes ago).

Hence, if the notification 1210 was added to a notification list, the notification list is updated to include the second notification 1250 instead. The second notification 1250 is arranged in the notification list according to the second time stamp. Similarly, if the first notification 1210 was presented as an in-context or pop-up notification, the presentation is updated to show the second notification 1250 instead.

Figure 13:
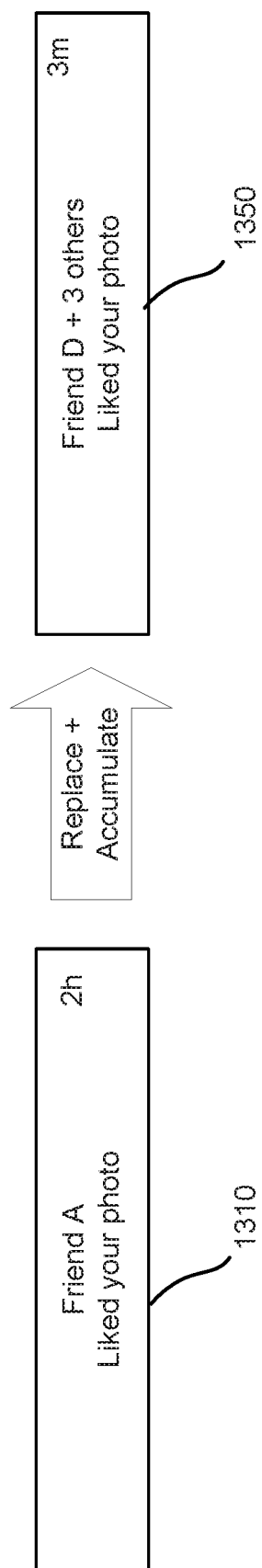
FIG. 13 illustrates an example of replacing and accumulating a notification, according to embodiments of the present disclosure.

FIG. 13 illustrates an example of replacing and accumulating a notification, according to embodiments of the present disclosure. Notification replacement and accumulation is another method for notification replacement. Here, in addition to replacing the notification, the method uses a counter (e.g., an accumulate parameter) to count up the number of times the replacement has been performed. Accordingly, a user can be notified not only that the notification has been replaced, but also that there has been additional activity regarding the replaced notification. The presentation of the counter can be within the notification, separate from the notification or shown alone without a presentation of the notification.

In an example, the notification replacement and accumulation is used when the previous content is not outdated and/or still has a relevance. In addition, the notification replacement and accumulation is used when the quantity of the value of the counter can affect the perceived importance of the replaced content.

As illustrated in FIG. 13, a first notification 1310 relates to an event (e.g., a photo posted by the user on a social media platform). The first notification 1310 has a first time stamp (e.g., two hours) and includes notification data about the event (e.g., a photo like by Friend A). Over time, other notification data is received and relates to the same event. For instance, second, third, and fourth notification data are received at different times indicating photo likes from three other friends. The latest notification data (the fourth one—a photo like from Friend B) has a fourth time stamp (e.g., three minutes) and is used as the last replacement. In addition, the counter is increased each time one of the notification data is received and, hence, its current value is three. Accordingly, a new notification 1350 replaces the first notification 1310 and has the fourth time stamp. The new notification 1350 includes the latest notification data (e.g., the a photo like from Friend D) and shows the latest value of the counter (e.g., three others).

Hence, if the notification 1310 was added to a notification list, the notification list is updated to include the new notification 1350 instead. The new notification 1350 is arranged in the notification list according to the fourth time stamp. Similarly, if the first notification 1310 was presented as an in-context or pop-up notification, the presentation is updated to show the new notification 1350 instead.

Figure 14:
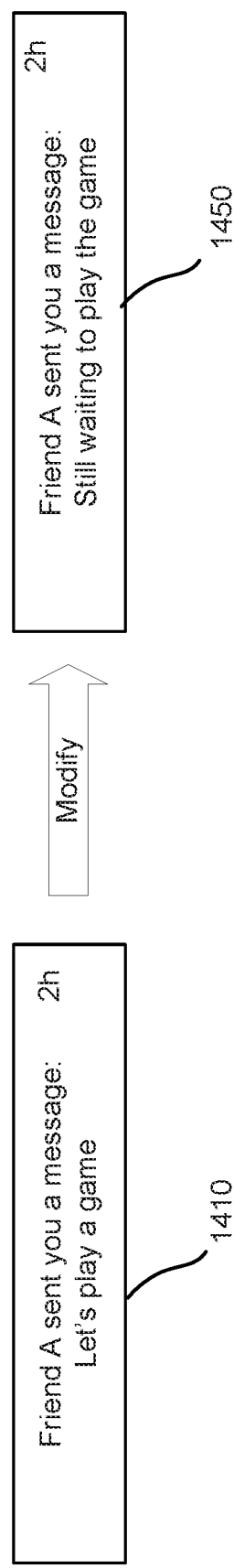
FIG. 14 illustrates an example of modifying a notification, according to embodiments of the present disclosure.

FIG. 14 illustrates an example of modifying a notification, according to embodiments of the present disclosure. The notification modification represents a method in which a notification has additional notification data added to the notification without notifying the user in the foreground. This method does not re-notify the user of the changes and will maintain the notification in its chronological order within a notification list.

In an example, the notification modification is used when the existing notification has not been presented yet and the additional notification data does not impact the relevance or time sensitivity of the original notification data or when the additional notification data is to the same destination application and includes the same actions as the original notification data. The notification modification is also used to avoid generating a new notification and changing its order in the notification list.

As illustrated in FIG. 14, a first notification 1410 relates to an event (e.g., an invitation to a game play). The first notification 1410 has a first time stamp (e.g., two hours) and includes notification data about the event (e.g., a game invitation from Friend A). Subsequently, additional notification data is received, relates to the event, and does not change the relevance of the first notification. For instance, the additional notification data indicates that Friend A is still waiting for an accept or decline of the game invitation. Accordingly, a modified notification 1450 is presented, where this modified notification 1450 is the same as the first notification 1450 except that its content has changed (e.g., indicating that Friend A is still waiting). The time stamp of the first notification 1410 can be shown in the modified notification 1450.

Figure 15:
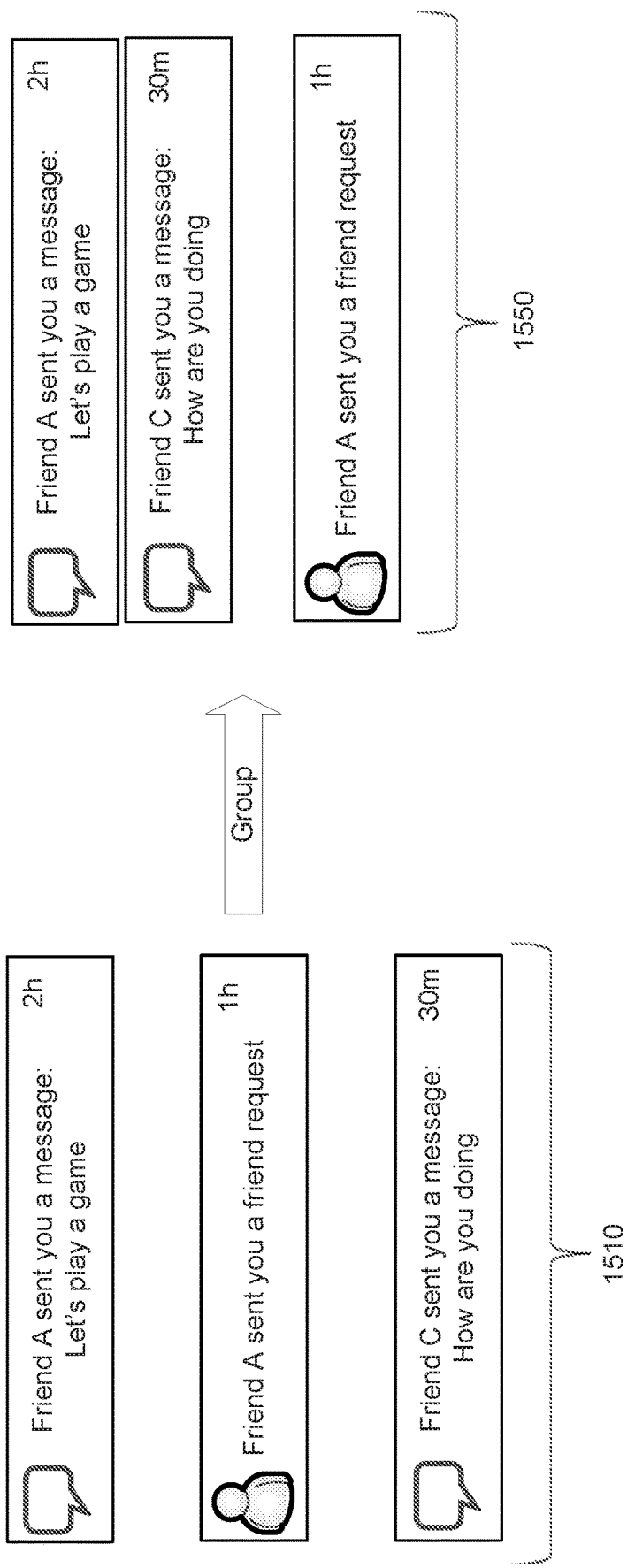
FIG. 15 illustrates an example of grouping notifications, according to embodiments of the present disclosure.

FIG. 15 illustrates an example of grouping notifications, according to embodiments of the present disclosure. Notification grouping represents a method in which one notification is grouped together with at least another notification. Notifications are grouped together, but are treated as individual notifications. This method allows a user to view a high-level summary of notification activity. When viewing in a notification list, the notifications are still being displayed separately and in a chronological order.

In an example, the notification grouping is used when notifications share at least one common attribute. For instance, when multiple notifications have the same notification type (e.g., chat messages), the notifications are grouped together under a group corresponding to the notification type. Similarly, when multiple notifications are associated with the same source application, destination application, and/or type of source and/or destination application, these notifications can be grouped together.

As illustrated in FIG. 15, a first set 1510 of notifications is added to a notification list. The first set 1510 includes a first chat notification having a first time stamp (two hours ago), a social media notification having a second time stamp (one hour ago), and a second chat notification having a third time stamp (thirty minutes ago). The two chat notifications are grouped together, but the social media notification is not. The grouping does not alter any of the notifications or their time stamps. Hence, upon completion of the groping, a second set 1550 of notifications is defined. The second set 1550 represents a re-organization of the first set 1510. In the second set 1550, the first chat notification and the second chat notification are grouped together according to their chronological order (e.g., the first chat notification is listed first).

Figure 16:
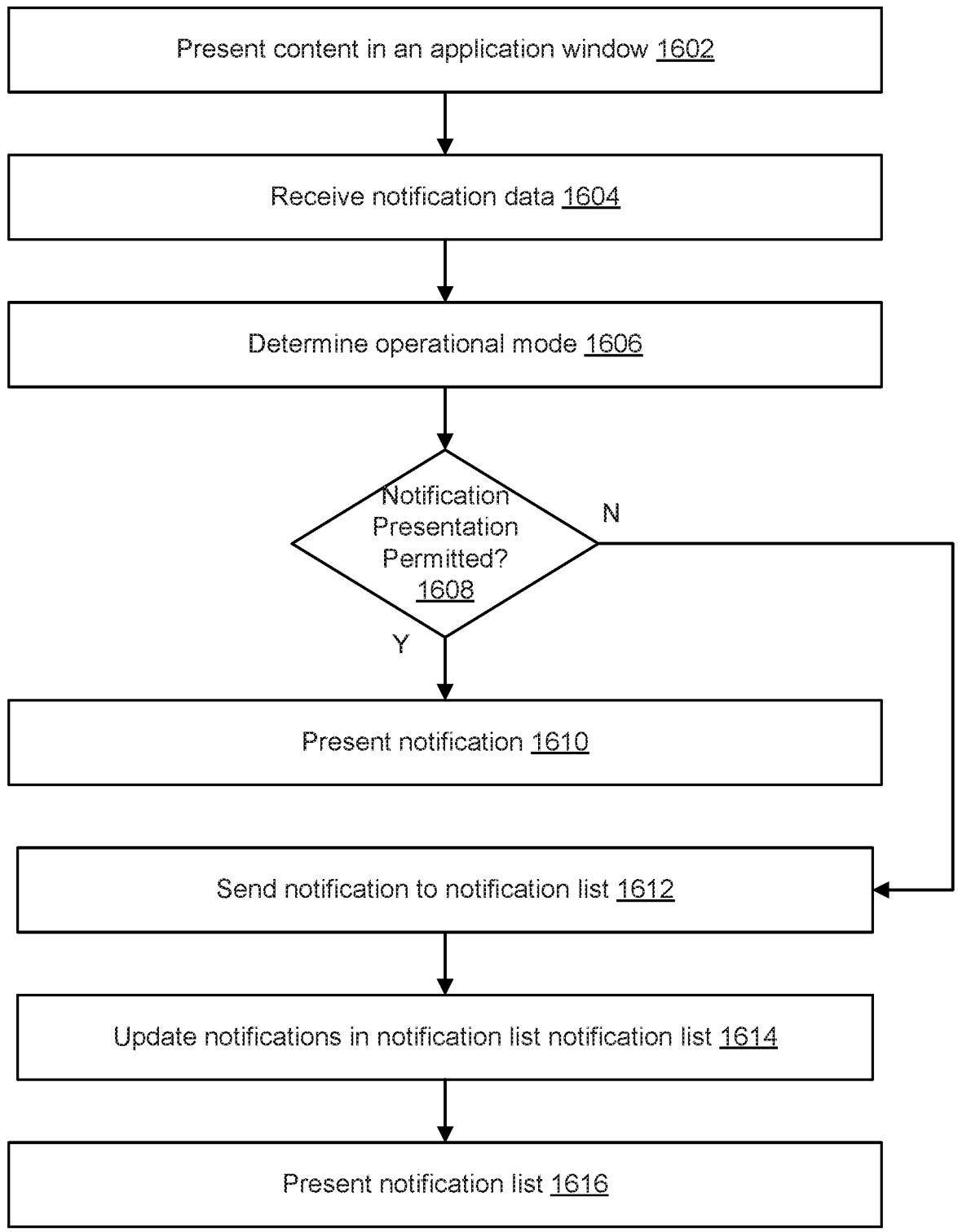
FIG. 16 illustrates an example of a flow for presenting notifications, according to an operational mode, according to embodiments of the present disclosure.

FIG. 16 illustrates an example of a flow for presenting notifications, according to an operational mode, according to embodiments of the present disclosure. The operations of the flow can be implemented as hardware circuitry and/or stored as computer-readable instructions on a non-transitory computer-readable medium of a computer system, such as a video game system or backend server. As implemented, the instructions represent modules that include circuitry or code executable by a processor(s) of the computer system. The execution of such instructions configures the computer system to perform the specific operations described herein. Each circuitry or code in combination with the processor represents a means for performing a respective operation(s). While the operations are illustrated in a particular order, it should be understood that no particular order is required.

As illustrated, the flow starts at operation 1602, where the computer system presents content in an application window. For example, an application is executing and presents the content in the application window on a GUI of a display communicatively coupled with a device. The device can be a computing component of the computer system.

In an example, at operation 1604, the computer system receives notification data. The notification data is received from another device and is associated with a source application, a destination application, a notification type, and/or a notification subject, among other attributes.

In an example, at operation 1606, the computer system determines an operational mode of the device. Generally, the operational mode corresponds to the mode of operation of the device at a point in time of receiving the notification data or in a time window that includes this point in time. Different techniques are available to determine the operational mode. In one example technique, user input is received to launch the operational mode. This user input represents a user selection of the operational mode. In another example technique, the determination need not rely on a user selection. Instead, based on the type of the content that is being presented, a title of the content, a source of the content, a type of the application, a level of user attention, and/or a level of user interaction, the operational mode is determined. For instance, when the content represents video game content and the level of user interaction indicates that the user is actively playing a video game, a video game mode is determined.

In an example, at operation 1608, the computer system determines whether a notification corresponding to the notification data should be presented. In particular, the notification mode is associated with notification settings. The notification settings can specify whether the presentation of the notification is permitted based on an attribute of the notification data, such as the source application, destination application, notification type, and/or notification subject. If permitted, operation 1610 follows operation 1608. Otherwise, operation 1612 follows operation 1608.

In an example, at operation 1610, the computer system presents the notification as in-context notification or as a pop-up notification. A set of rules can be used to determine the type of the notification as described herein above in connection with FIGS. 4-9.

In an example, at operation 1612, the computer system has determined that the presentation of the notification should be restricted. Accordingly, the computer system sends the notification to a notification list (or to a notification summary as described in connection with the next figures).

In an example, at operation 1614, the computer system updates the notification in the notification list. Different types of updates are possible, including a notification replacement, a notification replacement and accumulation, a notification modification, and/or a notification grouping. The updates can depend on the attributes of the notifications and on a set of the update rules as described herein above in connection with FIGS. 12-15.

In an example, at operation 1616, the computer system presents the notification list. Different triggers are possible to trigger this presentation. In one illustration, user input is received and indicates a request for the notification. In particular, a selectable icon can be presented on the GUI and a user selection of this icon indicates the request. The various notifications are shown in the notification list in a collapsed state and are arranged according to their chronological order. A user selection of one of these notifications changes its presentation to an expanded state.

As indicated herein above with operations 1608 and 1612, if the notification settings associated with the operational mode indicates that the presentation of the notification is restricted, this notification may not be presented and is added to the notification list instead. However, there can be a case when the computer system determines that the operational mode changes to a second operational mode associated with a second set of notification settings. In this case, the computer system determines whether the second set permits the presentation. If so, the notification is presented and is removed from the notification list. For example, while in the operational mode, notifications may have been received and not presented. Upon a determination of a change to the second operational mode, the computer system may determine a set of such notifications and present at least a subset of notifications that were received and not presented. Here, the presentation (e.g., which notifications to present, the total number of such notifications, the presentation style, and other presentation factors) can depend on the notification settings of the second operational mode.

The above flow is illustrated in connection with notification settings and rules. The notification settings and rules can be predefined and manually updated based on user input to reflect user preferences and/or user settings. In addition, such notification settings and rules can be automatically learned by the computer system. For example, data about the user context and/or the application context can be tracked for the user and across different users under different operational modes. A ML algorithm is trained based on such data to output parameters that define the notification settings and rules. Such notification settings and rules can then be pushed to the computer system or the trained ML algorithm itself can be hosted on the computer system, whereby the user context and/or application context are used as an input and output is received indicating whether a notification should be presented and the notification type.

Figure 17:
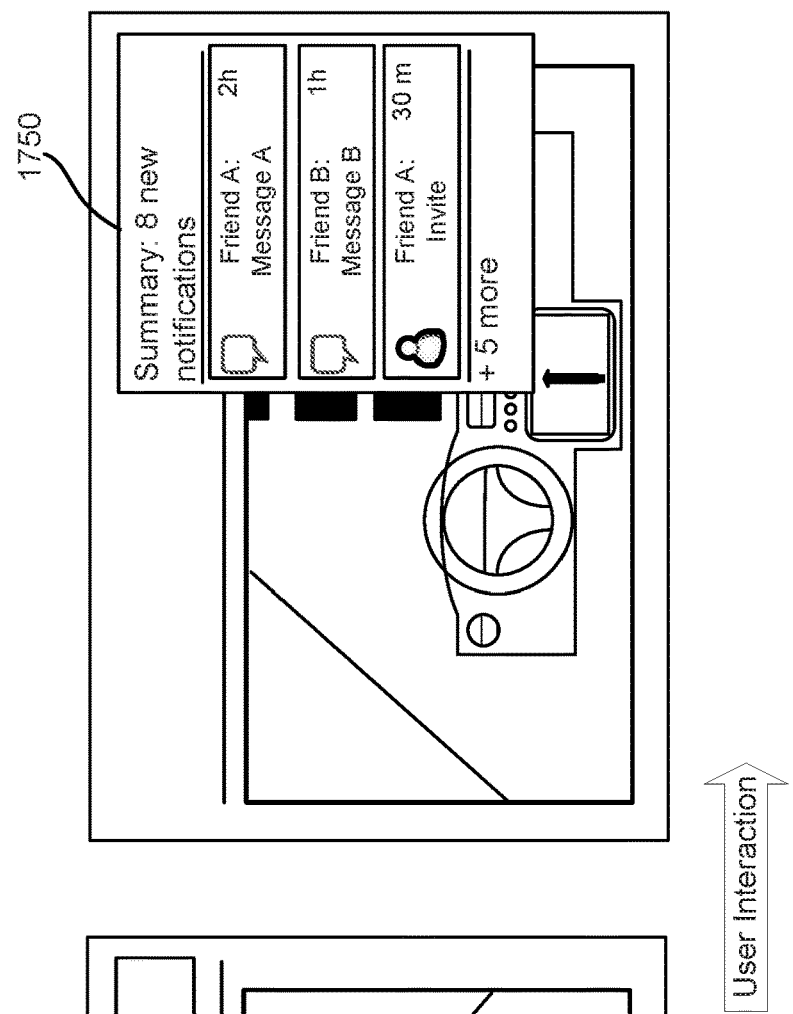
FIG. 17 illustrates an example of a notification summary, according to an operational mode, according to embodiments of the present disclosure.

FIG. 17 illustrates an example of a notification summary, according to an operational mode, according to embodiments of the present disclosure. Generally, an application may be executing and presenting content in an application window on a GUI. Upon a determination that notification data should not be presented in a notification (in-context or pop-up), the notification data can be added to a queue. A notification summary can be generated from the queue, where the notification summary includes notifications that have not been presented. These notifications can have different attributes (e.g., of different notification types, associated with different source applications and/or destination applications, etc.). The notifications in the summary are organized based on their priorities. A priority of a notification can be defined based on the notification's relevance and recency. Over time, the priorities can change and the notifications may be re-organized. The notification summary can be presented on the GUI in a first state, such as a collapsed state, indicating the total number of notifications in the notification summary. Upon a user selection of the notification summary, the notification summary is presented in a second state, such as an expanded state, showing some or all of the notifications. In this way, a user can quickly determine the total number of notifications that were not shown and can have quick and efficient access to the highest priority notifications.

As illustrated in FIG. 17, an application (e.g., a video game application) presents content (e.g., video game content) in an application window 1720 on a GUI 1710 of a display. Notification data corresponding to multiple notifications is received. Given a particular context (e.g., the notification data being unassociated with the application and the application window 1720 being in the foreground), a determination is made not to present the notifications. Instead, a notification summary 1730 is presented in a first state on the GUI 1710 indicating that the notifications were received and can be viewed.

In an example, the notification summary 1730 is presented in a pop-up window outside of the application window 1720. In another example, the notification summary 1730 is presented in a pop-up window over, at least partially, the application window 1720. In yet another example, the notification summary 1730 is presented as a dynamic icon in a predefined area of the GUI 1710 (e.g., top right corner) showing the total number of notifications. In a further example, the notification summary 1730 is not presented until the particular context changes. For instance, once the application stops executing or the application window 1720 moves to the background, the notification summary 1730 is presented.

Upon a user interaction with the notification summary 1730 indicating a user selection, the notification summary 1730 is presented in a second state (FIG. 17 illustrates the notification summary 1730 in the second state as a notification summary 1750). In the second state, additional information related to the notifications can be presented. For instance, one or more of the notifications are identified.

Figure 18:
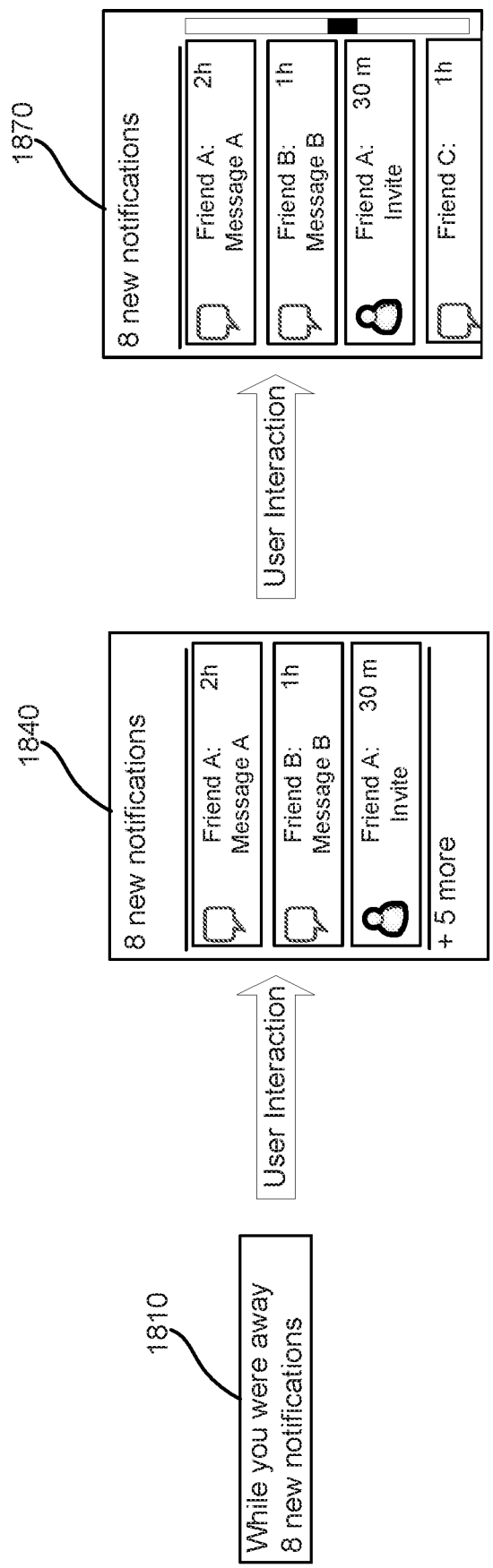
FIG. 18 illustrates examples of states of a notification summary, according to embodiments of the present disclosure.

FIG. 18 illustrates examples of states of a notification summary, according to embodiments of the present disclosure. In an example, multiple states are possible and a different level of information can be shown in each state.

A first state 1810 corresponds to a collapsed state and shows a header of a notification summary. The header indicates that notifications have not been presented (e.g., by including text such as: "while you were [away/gaming/watching, etc.] . . . ") and the total number of such notifications (e.g., "eight new notifications"). In addition, the header can indicate a reason why the notification summary is presented. Different reasons may exist, generally depend on a user context and/or an application context, and correspond to the conditions that resulted in queuing the notifications rather than presenting them immediately. For instance, the notification summary is presented on a display coupled to a computing device. One reason corresponds to an operational mode of the computing device that prevented the immediate presentation (e.g., "while you were gaming, eight notifications were received"). Another reason corresponds to one or more notifications being received while the computing device is powered off (e.g., "while you were away, eight notifications were received"). Yet another reason corresponds to the relevant user not being logged in onto the computing device (e.g., "while you were logged off, eight notifications were received"). In this way, the notification summary and the reason for the notification summary are presented simultaneously under the first state 1810.

A second state 1840 corresponds to an expanded state and shows the header, a preview of a selected subset of the notifications, and a total number of remaining notifications that are not in the preview. The header can remain the same or can be modified (e.g., does not include the text, need not but may show the reason for the notification summary, etc.). Nonetheless, the header typically shows the total number of notifications that are in the notification summary. The selected subset corresponds to a predefined number of the highest priority notifications (e.g., the top three notifications). The preview shows each such notification in a collapsed state (as described in connection with FIG. 8). At the bottom of the notification summary, the total number of remaining notifications is shown and this number corresponds to the total number of notifications in the notification summary minus the total number of notifications in the preview (e.g., "five remaining notifications").

As explained herein above, a notification is presented in a collapsed state in the preview from the notification summary. User input can be received and can indicate a user selection of the notification. In response, the notification can be presented in an expanded state. Different techniques are possible for the presentation of the notification in the expanded state. In one technique, the notification summary is further expanded (e.g., the size of its window is increased) and the expanded notification is still presented within the notification summary (e.g., within the window by pushing down other notifications from the preview). In another technique, the expanded notification is shown in a separate window from the notification summary. In this case, the notification summary can be updated by removing the notification from it.

A third state 1870 also corresponds to an expanded state. Here, however all the notifications are previewed rather than a subset. If previewing the notifications necessitates a larger area than the window of the notification summary, a scrolling mechanism can be used to scroll through the notifications. These notifications are organized according to their priorities, where the highest priority notification is previewed at the top of the notification summary and the lowest priority notification is previewed at the bottom of the notification summary.

Figure 19:
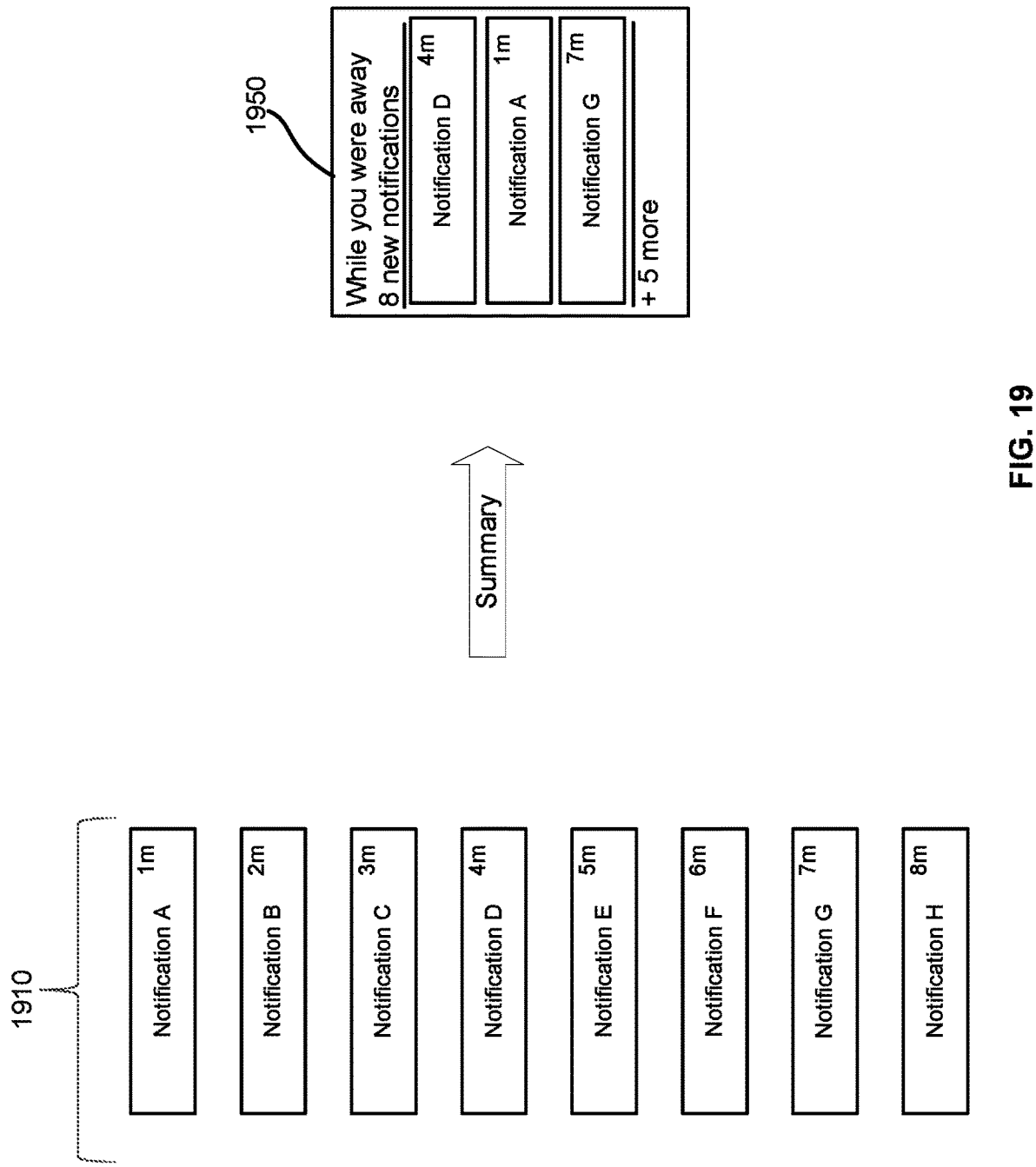
FIG. 19 illustrates examples of summarizing notifications, according to embodiments of the present disclosure.

FIG. 19 illustrates examples of summarizing notifications, according to embodiments of the present disclosure. In an example, notifications are organized according to their priorities. In an expanded state, a notification summary previews a subset of the notifications, where the subset is selected based on the priorities. A priority of a notification can be defined as either or both of its relevance and its recency. The relevance indicates how relevant the notification is to a current context, such as a user context and/or an application context. The recency indicates the difference between the current time and the time the corresponding notification data was received.

As illustrated, a set 1910 of notifications (or notification data) has been queued (FIG. 19 shows eight notifications). Each of such notification is associated with a time stamp, representing the point in time when the corresponding notification data was received. The recency of a notification can be determined as a difference between the current time and the time stamp (e.g., as illustrated, "Notification A" has a one minute recency indicating that the corresponding notification data was received a minute ago).

Different techniques are available to determine the relevance of the notification. In one technique, the relevance depends on the type of the notification. In particular, a relevance can be predefined per notification type (or any other attribute of notification type such as source application, destination application, counter, type of the source and/or destination application, etc.). For instance, if the notification is a video game notification, its relevance is higher than that of a social media notification, which in turn is higher than a promotion notification. In another technique, the relevance can change depending on the operational mode. In particular, each operational mode can be associated with a predefined relevance per notification type (or any other attribute). For instance, if the operational mode is a social media mode, social media notifications are associated with the highest relevance. In a further technique, the relevance depends on whether the notification is associated with an application having an application window in the foreground or the background. If in the foreground, the relevance is higher than that of a notification associated with a background application window. In yet another technique, the relevance depends on the user context and/or application context. If such contexts indicate an activity, event, update, or feedback and if the notification is associated with the activity, event, update, or feedback, its relevance is increased. For instance, if the user context indicates that user attention is on video game content and if the application context indicates user interaction with a particular video game application, a notification related to the video game application has a higher relevance than a notification related to another video game application, which in turn has a higher relevance than a notification related to a non-video game application. In another technique, when notification data is sent to a queue and a corresponding first notification is added to the notification summary, the notification data can also be sent to a second device of the user, such as to the user's mobile device. User interaction with the corresponding second notification on the second device is monitored. If the second notification is presented, the relevance of the first notification in the notification summary is decreased to a minimum or even the first notification can be removed from the notification summary. If the second notification is dismissed without being presented, the relevance of the first notification can be decreased to a predefined level (but not to a minimum). If no user interaction with the second notification is detected, the relevance of the first notification is not changed. In a further technique, a ML algorithm can be used to generate the relevance of a notification. In particular, data about the user context and/or the application context and how notifications are presented and dismissed, or restricted and subsequently viewed can be tracked for the user and across different users. The ML algorithm is trained based on such data to output relevance of notifications.

Over time, the priority of a notification in the notification summary changes based on one or both of its relevance and recency. At time intervals (e.g. every five minutes) or when a priority change is detected, the notifications in the notification summary can be re-arranged. Additionally or alternatively, at a point in time when the notification summary is to be presented on the GUI, the latest priorities of the notifications are determined and these notifications are re-arranged accordingly.

In an example, the notification summary is organized first based on the relevance assigned to each notification (e.g., messages having higher relevance than promotions). The notifications are then sorted based on recency (e.g., the latest message is shown above an older message). A predefined number (e.g., three) of the highest priority notifications (e.g., the first three notifications in the notification summary) can be presented in a preview of the notification summary.

As illustrated in FIG. 19, a notification summary 1950 of the set 1910 of notifications can be presented in an expanded state that also indicates the reason why the notification summary 1950 is presented. At the time of presentation, "Notification D" has the highest relevance, followed by "Notification A" and "Notification G," although "Notification A" was received prior to "Notification D."

Figure 20:
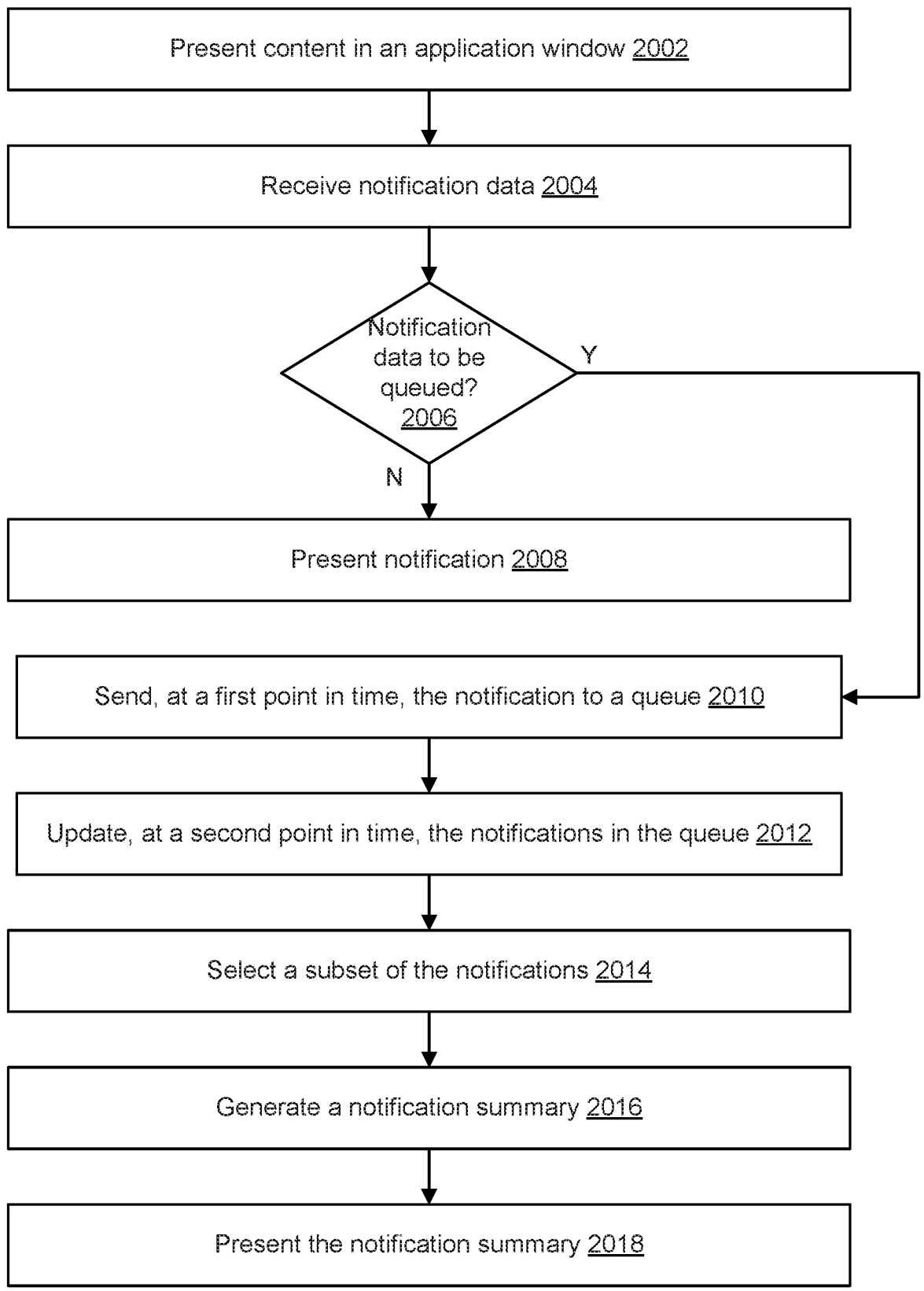
FIG. 20 illustrates an example of a flow for summarizing and presenting notifications, according to embodiments of the present disclosure.

FIG. 20 illustrates an example of a flow for summarizing and presenting notifications, according to embodiments of the present disclosure. The operations of the flow can be implemented as hardware circuitry and/or stored as computer-readable instructions on a non-transitory computer-readable medium of a computer system, such as a video game system or backend server. As implemented, the instructions represent modules that include circuitry or code executable by a processor(s) of the computer system. The execution of such instructions configures the computer system to perform the specific operations described herein. Each circuitry or code in combination with the processor represents a means for performing a respective operation(s). While the operations are illustrated in a particular order, it should be understood that no particular order is required.

As illustrated, the flow starts at operation 2002, where the computer system presents content in an application window. For example, an application is executing and presents the content in the application window on a GUI of a display communicatively coupled with a device. The device can be a computing component of the computer system.

In an example, at operation 2004, the computer system receives notification data. The notification data is received from another device and is associated with a source application, a destination application, a notification type, and/or a notification subject, among other attributes. The notification data can be used to present a notification on the GUI.

In an example, at operation 2006, the computer system determines whether the notification is to be queued. In particular, the computer system determines that a presentation of the notification is restricted (e.g., the notification is not to be presented as an in-context notification or as a pop-up notification). Different techniques are possible to determine whether the notification is to be restricted or presented, as described herein above. If it should be restricted, the computer system can determine whether the notification is to be queued. In an illustration, the computer system determines that the notification is to be queued based on a determination that the notification data is unassociated with the application and that the application window is presented in a foreground of the display. In another illustration, the computer system determines that the notification is to be queued based on a determination that the notification data is associated with the application and that the application window is presented in a background of the display. If the notification is to be presented, operation 2008 follows operation 2006. Otherwise, operation 2010 follows operation 2006.

In an example, at operation 2008, the computer system presents the notification as in-context notification or as a pop-up notification. A set of rules can be used to determine the type of the notification as described herein above in connection with FIGS. 4-9.

In an example, at operation 2010, the computer system sends, at a first point in time, the notification to a queue of notifications. Each of the notifications in the queue is associated with a notification priority. The notification priority can be defined as a relevance and a recency.

In an example, at operation 2012, the computer system updates, at a second point in time, the notifications in the queue. For instance, the relevance of each notification is updated as described herein above in connection with FIG. 19. The recency of each notification is also updated based on the time stamp of the notification. The notifications are re-organized (e.g., ranked) according to their relevance and sorted according to their recency.

In an example, at operation 2014, the computer system selects a subset of the notifications. For instance, a predefined number (e.g., three) notifications should be selected. The three highest priority (or the predefined number) notifications are selected and form the subset.

In an example, at operation 2016, the computer system generates a notification summary. The notification summary includes the various notifications organized according to the priorities. The notification summary can also include a header indicating the total number of notifications, a preview of the subset of notifications, and a footer indicating the total number of remaining notifications.

In an example, at operation 2018, the computer system presents the notifications summary. For instance, the notification summary is presented in a first state that shows the header. Based on a user interaction with the header, the notification summary is presented in a second state that further shows the preview and the footer. Upon a user interaction with the footer, the various notifications are previewed in the notification summary.

Although FIG. 20 illustrates that notification data is received while content is being presented in an application window, the flow similarly apply to presenting a notification summary when the notification data is received while power to the device is turned off or when a user is not logged in to the device. In addition, the computer system can generate a notification list that includes different sets of notifications. A first set can correspond to first notifications that have been received but presented. A second set can correspond to notifications that have been received and presented. Upon a trigger to present a notification summary, the notification summary can be generated from the notification list, where the notification summary includes a subset corresponding to one or more of the first notifications.

Figure 21:
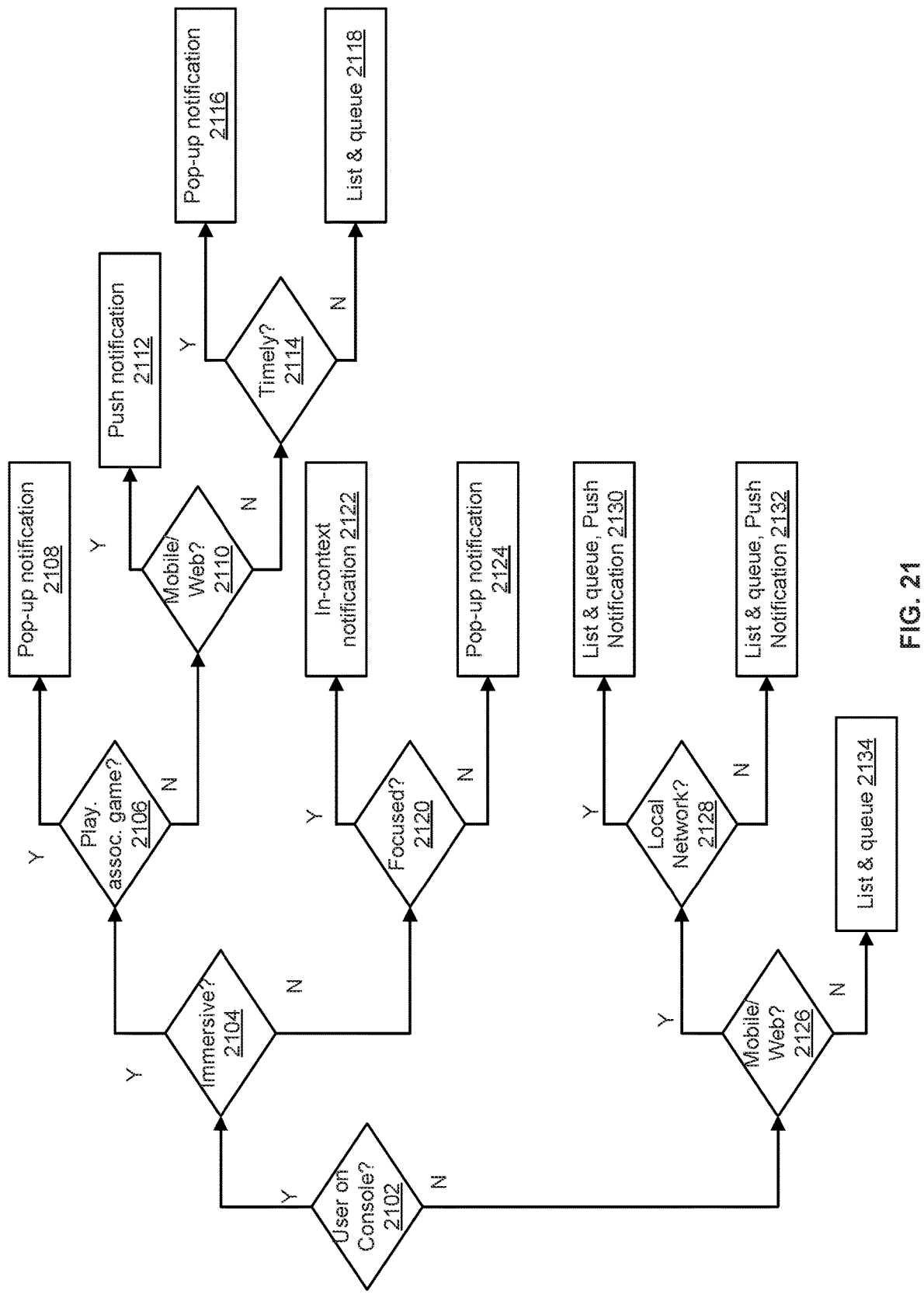
FIG. 21 illustrates an example of a flow for presenting in-context and pop-up notifications on a video game console, according to embodiments of the present disclosure.

FIG. 21 illustrates an example of a flow for presenting in-context and pop-up notifications on a video game console, according to embodiments of the present disclosure. The operations of the flow can be implemented as hardware circuitry and/or stored as computer-readable instructions on a non-transitory computer-readable medium of the video game console. As implemented, the instructions represent modules that include circuitry or code executable by a processor(s) of the video game console. The execution of such instructions configures the video game console to perform the specific operations described herein. Each circuitry or code in combination with the processor represents a means for performing a respective operation(s). While the operations are illustrated in a particular order, it should be understood that no particular order is required.

In an example, the video game console receives notification data. At operation 2102, the video game consoler determines whether a user login to the video game console exists. If so, operation 2104 follows operation 2102. Otherwise, operation 2126 follows operation 2102.

In an example, at operation 2104, the video game console determines whether an immersive user experience is being provided. In an illustration, an immersive user experience corresponds to one of predefined operational modes of the video game console. For instance, if the operational mode is a gaming mode, the video game console determines that an immersive user experience is being provided. In addition, the immersive user experience can depend on the user context (e.g., the level of user attention) and application context (e.g., the level of user interaction). When the level of user attention and/or the level of user interaction exceed a predefined level, a determination is made that the immersive user experience is provided. If so, operation 2106 follows operation 2104. Otherwise, operation 2120 follows operation 2104.

In an example, at operation 2106, the video game console determines whether a video game is being played. For instance, a video game application can be executing and video game content is presented in an application window. If the application window is in the foreground, a determination is made that a video game is being played. If so, operation 2108 follows operation 2106. Otherwise, operation 2110 follows operation 2106.

In an example, at operation 2108, the video game console determines that a pop-up notification should be presented. In particular, a user of the video game console is engaged in an immersive user experience and is playing a video game. Accordingly, the pop-up notification can be presented to alert the user.

In an example, at operation 2110, a determination is made whether the user is associated with a mobile device or a device having access to the web. This determination can be performed by the video game console based on a user profile or based on a backend server. If a backend server is used, the backend server may also monitor activities on the mobile device and/or online activities. In this case, a determination is also made whether such activities exist. If so (the user associated with the mobile device or the device having access to the web and, optionally, activities are detected), operation 2112 follows operation 2110. Otherwise, operation 2114 follows operation 2110.

In an example, at operation 2112, the video game console sends a push notification to the mobile device or the other device.

In an example, at operation 2114, the video game console determines whether the notification is time sensitive or not (e.g., based on an attribute of the notification; for instance, system notifications are time sensitive). If time sensitive, operation 2116 follows operation 2114. Otherwise, operation 2118 follows operation 2114.

In an example, at operation 2116, the video game console determines that a pop-up notification should be presented. In particular, the pop-up notification is needed because of the time sensitivity. Accordingly, the pop-up notification can be presented to alert the user.

In an example, at operation 2118, the video game console sends the notification to a notification and/or a queue to be added to a notification summary.

In an example, at operation 2120, the video game console determines a user focus on the content that is presented (or any service provided) by the video game console. The user focus can depend on the user context and/or the application context. When the level of user attention and/or the level of user interaction exceed a predefined level, a determination is made that the user focus is on the content. If so, operation 2122 follows operation 2120. Otherwise, operation 2124 follows operation 2120.

In an example, at operation 2122, the video game console determines that an in-context notification should be presented. Accordingly, the in-context notification can be presented as in-line, in-application, or in-flow.

In an example, at operation 2124, the game console determines that a pop-up notification should be presented. Accordingly, the pop-up notification can be presented to alert the user.

In an example, at operation 2126, a determination is made whether the user is associated with the mobile device or the device having access to the web, similarly to operation 2110. If so (the user associated with the mobile device or the device having access to the web and, optionally, activities are detected), operation 2128 follows operation 2126. Otherwise, operation 2134 follows operation 2126.

In an example, at operation 2128, the video game console determines whether the mobile device or the other device is connected to a local area network. For instance, this determination is made based on a service set identifier (SSID) of the access point to which the mobile device or other device is connected. If so, operation 2130 follows operation 2128. Otherwise, operation 2132 follows operation 2128.

In an example, at operation 2130, the video game console sends the notification to the notification and/or the queue to be added to the notification summary. The video game console also sends a push notification to the mobile device or the other device. The push can be performed over the local area network.

In an example, at operation 2132, the video game console sends the notification to the notification and/or the queue to be added to the notification summary. The video game console also sends a push notification to the mobile device or the other device. The push can be performed over a remote network.

In an example, at operation 2134, the video game console sends the notification to the notification and/or the queue to be added to the notification summary.

Figure 22:
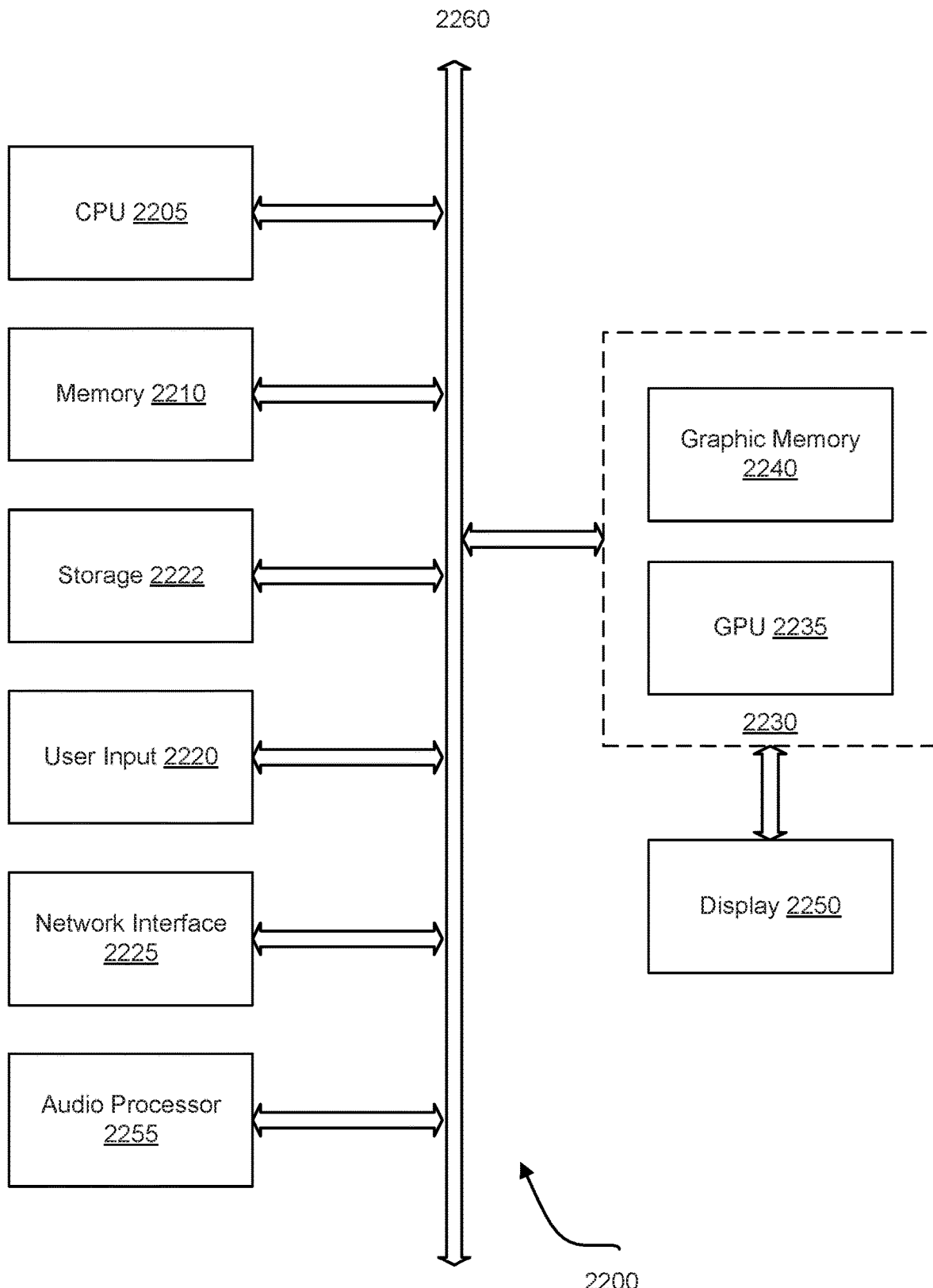
FIG. 22 illustrates an example of a hardware system suitable for implementing a computer system, according to embodiments of the present disclosure.

FIG. 22 illustrates an example of a hardware system suitable for implementing a computer system 2200, according to embodiments of the present disclosure. The computer system 2200 represents, for example, a video game system, a backend set of servers, or other types of a computer system. The computer system 2200 includes a central processing unit (CPU) 2205 for running software applications and optionally an operating system. The CPU 2205 may be made up of one or more homogeneous or heterogeneous processing cores. Memory 2210 stores applications and data for use by the CPU 2205. Storage 2215 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 2220 communicate user inputs from one or more users to the computer system 2200, examples of which may include keyboards, mice, joysticks, touch pads, touch screens, still or video cameras, and/or microphones. Network interface 2225 allows the computer system 2200 to communicate with other computer systems via an electronic communications network, and may include wired or wireless communication over local area networks and wide area networks such as the Internet. An audio processor 2255 is adapted to generate analog or digital audio output from instructions and/or data provided by the CPU 2205, memory 2210, and/or storage 2215. The components of computer system 2200, including the CPU 2205, memory 2210, data storage 2215, user input devices 2220, network interface 2225, and audio processor 2255 are connected via one or more data buses 2260.

A graphics subsystem 2230 is further connected with the data bus 2260 and the components of the computer system 2200. The graphics subsystem 2230 includes a graphics processing unit (GPU) 2235 and graphics memory 2240. The graphics memory 2240 includes a display memory (e.g., a frame buffer) used for storing pixel data for each pixel of an output image. The graphics memory 2240 can be integrated in the same device as the GPU 2235, connected as a separate device with the GPU 2235, and/or implemented within the memory 2210. Pixel data can be provided to the graphics memory 2240 directly from the CPU 2205. Alternatively, the CPU 2205 provides the GPU 2235 with data and/or instructions defining the desired output images, from which the GPU 2235 generates the pixel data of one or more output images. The data and/or instructions defining the desired output images can be stored in the memory 2210 and/or graphics memory 2240. In an embodiment, the GPU 2235 includes 3D rendering capabilities for generating pixel data for output images from instructions and data defining the geometry, lighting, shading, texturing, motion, and/or camera parameters for a scene. The GPU 2235 can further include one or more programmable execution units capable of executing shader programs.

The graphics subsystem 2230 periodically outputs pixel data for an image from the graphics memory 2240 to be displayed on the display device 2250. The display device 2250 can be any device capable of displaying visual information in response to a signal from the computer system 2200, including CRT, LCD, plasma, and OLED displays. The computer system 2200 can provide the display device 2250 with an analog or digital signal.

In accordance with various embodiments, the CPU 2205 is one or more general-purpose microprocessors having one or more processing cores. Further embodiments can be implemented using one or more CPUs 2205 with microprocessor architectures specifically adapted for highly parallel and computationally intensive applications, such as media and interactive entertainment applications.

The components of a system may be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. "About" includes within a tolerance of ±0.01%, ±0.1%, ±1%, ±2%, ±3%, ±4%, ±5%, ±8%, ±10%, ±15%, ±20%, ±25%, or as otherwise known in the art. "Substantially" refers to more than 66%, 155%, 80%, 90%, 95%, 99%, 99.9% or, depending on the context within which the term substantially appears, value otherwise as known in the art.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for presenting notifications and implemented by a computer system, the method comprising:
   presenting, in an application window on a display, content based on an execution of an application;
   receiving notification data;
   determining whether a match exists between a first context associated with the notification data and a second context associated with the application;
   determining whether the notification data is to be presented in the application window or is to be sent to a queue based on whether the match exists, the queue storing other notification data corresponding to another notification that is associated with a restricted presentation; and
   presenting, based on determining that the match exists, at least the notification data or a notification in the application window over at least a portion of the content while a presentation of the content continues, the notification being separate from the notification data and indicating that the notification data is presented.

2. The method of claim 1, further comprising:
   determining a location within the application window for presenting the notification data;
   determining that a user view area includes the location; and
   presenting the notification data in the location, wherein the notification is presented as a visual indicator of at least a portion of the notification data.

3. The method of claim 1, further comprising:
   determining a location within the application window for presenting the notification data; and
   determining that the location is outside of a user view area, the notification is presented as a notification window within user view area and indicates that notification data is available for presentation.

4. The method of claim 1, wherein presenting the content in the application window is associated with a flow of a task being performed by the application, wherein the notification is presented as an update to the flow.

5. The method of claim 1, further comprising:
   receiving second notification data;
   determining that the second notification data is associated with a second application;
   determining that a second application window of the second application is in a background of the display; and
   presenting a second notification in a pop-up window over the application window based on the second notification data being associated with the second application and the second application window being in the background, the second notification corresponding to the second notification data and presented while the presentation of the content continues.

6. The method of claim 5, wherein the second notification is presented in a first state that indicates at least one of a notification type or a title of the second notification.

7. The method of claim 6, further comprising:
   receiving a user interaction with the second notification; and
   presenting, based on the user interaction, the second notification in a second state in the pop-up window while the presentation of the content continues, wherein the second state indicates a description of the second notification from the notification data and a selectable action.

8. The method of claim 7, further comprising:
   receiving an update to at least one of the description or the selectable action; and
   presenting, while the presentation of the content and a presentation of the second notification in the second state continue, the update in the second notification.

9. The method of claim 1, wherein the content is presented by a user device of the computer system, and further comprising:
   determining an operational mode of the user device;
   receiving second notification data;
   determining that the operational mode restricts a presentation of the second notification data based on at least one of: an association of the second notification data with a second application or a type of the second notification data; and
   sending the second notification data to the queue.

10. The method of claim 1, wherein the first context comprises at least one of: a first user identifier associated with a first user of the application, a second user identifier associated with a second user of a source application that generated the notification data, a subject of the notification data, a type of the notification data, a first application identifier associated with the application, a second application identifier associated with the second application, a first platform identifier associated with a first platform hosting the application, or a second platform identifier associated with a second platform hosting the source application, and wherein the second context comprises at least one: the first user identifier, the first application identifier, the first platform identifier, an operational mode, or an indication that the application window is in a foreground of the display.

11. A computer system comprising:
    one or more processors; and
    one or more memories storing computer-readable instructions that, upon execution by the one or more processors, configure the computer system to:
    present, in an application window on a display, content based on an execution of an application;
    receive notification data;
    determine whether a match exists between a first context associated with the notification data and a second context associated with the application;
    determine whether the notification data is to be presented in the application window or is to be sent to a queue based on whether the match exists, the queue storing other notification data corresponding to another notification that is associated with a restricted presentation; and
    present, based on determining that the match exists, at least the notification data or a notification in the application window over at least a portion of the content while a presentation of the content continues, the notification corresponding to the notification data and indicating that the notification data is presented.

12. The computer system of claim 11, wherein the first context indicates a source application, a notification type, and a notification subject, wherein determining the match comprises determining a first match between the source application and the application and a second match between at least the notification type and a type of the content or the notification subject and a subject of the notification.

13. The computer system of claim 11, wherein the content is presented to a user, and wherein the execution of the computer-readable instructions further configures the computer system to:
in response to receiving the notification data, determine at least one of:
a level of attention of the user to the content, or
a level of user interaction with the application; and
select a first presentation mode for the notification from a plurality of presentation modes based on at least one of the level of attention or the level of user interaction, the first presentation mode indicating a presentation of the notification in the application window, the plurality of presentation modes comprising a second mode indicating a presentation in a pop-up window over the application window.

14. The computer system of claim 13, wherein the notification comprises at least one of a description about the notification or a selectable action, wherein the execution of the computer-readable instructions further configures the computer system to:
determine an update to at least one of the level of attention or the level of user interaction;
determine, based on the update, at least one of an updated description about the notification or an updated selectable action; and
present at least one of the updated description or the updated selectable action in the notification in the application window continues.

15. The computer system of claim 13, wherein determining the match comprises:
determining that the notification data is associated with the application; and
determining that the application window is in a foreground of the display.

16. One or more non-transitory computer-readable storage media storing computer-readable instructions that, upon execution on a computer system, cause the computer system to perform operations comprising:
presenting, in an application window on a display, content based on an execution of an application;
receiving notification data;
determining whether a match exists between a first context associated with the notification data and a second context associated with the application;
determining whether the notification data is to be presented in the application window or is to be sent to a queue based on whether the match exists, the queue storing other notification data corresponding to another notification that is associated with a restricted presentation; and
determining, based on determining that the match exists, a presentation style for presenting a notification that corresponds to the notification data; sand
presenting the notification according to the presentation style in the application window over at least a portion of the content, the notification presented while a presentation of the content continues.

17. The one or more non-transitory computer-readable storage media of claim 16, wherein the presentation style is determined from a plurality of presentation styles comprising an in-line presentation, in-application presentation, and an in-flow presentation.

18. The one or more non-transitory computer-readable storage media of claim 16, wherein the application window is presented by a video game console, and wherein the operations further comprise:
receiving second notification data;
determining that the video game console is not presenting video game content in a foreground of the display;
determining a user context of a user of the video game console, the user context indicating that the user is not viewing the content; and
presenting a second notification in a pop-up window over the application window based on the user context.

19. The one or more non-transitory computer-readable storage media of claim 16, wherein the application is a video game application, wherein the content is video game content, and wherein the operations further comprise:
receiving second notification data;
determining a user context of a user, the user context indicating that the user is playing the video game application; and
presenting a second notification in a pop-up window over the application window based on the user context.

20. The one or more non-transitory computer-readable storage media of claim 16, wherein the application is a video game application, wherein the content is video game content, and wherein the operations further comprise:
receiving second notification data;
determining a user context of a user, the user context indicating that the user is not playing the video game application; and
sending, based on the user context, the second notification data to the queue.

* * * * *